US011205806B2

(12) United States Patent
Sung et al.

(10) Patent No.: US 11,205,806 B2
(45) Date of Patent: Dec. 21, 2021

(54) BATTERY MODULE EQUALIZATION APPARATUS AND BATTERY PACK AND VEHICLE INCLUDING THE SAME

(71) Applicant: LG CHEM, LTD., Seoul (KR)

(72) Inventors: Chang-Hyun Sung, Daejeon (KR); Sang-Hoon Lee, Daejeon (KR); Yean-Sik Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 266 days.

(21) Appl. No.: 16/476,007

(22) PCT Filed: Jul. 5, 2018

(86) PCT No.: PCT/KR2018/007651
§ 371 (c)(1),
(2) Date: Jul. 3, 2019

(87) PCT Pub. No.: WO2019/066214
PCT Pub. Date: Apr. 4, 2019

(65) Prior Publication Data
US 2019/0356025 A1 Nov. 21, 2019

(30) Foreign Application Priority Data
Sep. 27, 2017 (KR) .................. 10-2017-0125243

(51) Int. Cl.
*H02J 7/00* (2006.01)
*H01M 10/44* (2006.01)
(Continued)

(52) U.S. Cl.
CPC ........... *H01M 10/441* (2013.01); *B60L 58/22* (2019.02); *H01M 10/482* (2013.01);
(Continued)

(58) Field of Classification Search
CPC ............. H01M 10/441; H01M 10/482; H01M 10/425; H01M 10/4207; H01M 10/42;
(Continued)

(56) References Cited

U.S. PATENT DOCUMENTS 6,291,972 B1* 9/2001 Zhang ................... H02J 7/0022
320/118
6,502,083 B1* 12/2002 Louis ..................... G06N 3/063
706/27
(Continued)

FOREIGN PATENT DOCUMENTS

JP 2010-29050 A 2/2010
JP 2010-166721 A 7/2010
(Continued)

OTHER PUBLICATIONS

European Search Report for Patent Application Na. 18862020.7 dated Feb. 10, 2020.
(Continued)

*Primary Examiner* — John T Trischler
(74) *Attorney, Agent, or Firm* — Birch, Stewart, Kolasch & Birch, LLP

(57) ABSTRACT

A battery module equalization apparatus includes a plurality of slave controllers each electrically connected to the plurality of battery modules to measure voltage values of the plurality of battery modules, and having a slave charging/discharging channel through which the current that charges and discharges each battery module flows, and a master controller that receives the voltage value of each battery module from the plurality of slave controllers, selects at least one of the plurality of slave controllers based on the received voltage value, and transmits a CHARGE or DISCHARGE command to the at least one selected slave controller, and having a master charging/discharging channel through which the charging current supplied to the at least one slave
(Continued)

controller and the discharging current supplied from the at least one slave controller flow.

23 Claims, 10 Drawing Sheets

(51) Int. Cl.
    *H01M 10/48*     (2006.01)
    *B60L 58/22*     (2019.01)

(52) U.S. Cl.
    CPC .......... *H02J 7/0016* (2013.01); *H02J 7/0018* (2013.01); *H02J 7/0019* (2013.01); *H02J 7/0021* (2013.01); *H02J 7/0063* (2013.01); *H01M 2220/20* (2013.01)

(58) Field of Classification Search
    CPC ...... H02J 7/0019; H02J 7/0016; H02J 7/0021; H02J 7/0063; H02J 7/0018; B60L 58/22
    USPC ........................................................ 320/118
    See application file for complete search history.

(56) References Cited

U.S. PATENT DOCUMENTS

| | | | | |
|---|---|---|---|---|
| 6,523,018 B1* | 2/2003 | Louis | G06N 3/063 |
| | | | | 706/27 |
| 7,733,059 B2* | 6/2010 | Yoshida | H02J 7/0013 |
| | | | | 320/118 |
| 7,821,230 B2* | 10/2010 | Studyvin | H02J 7/0018 |
| | | | | 320/119 |
| 7,888,910 B2* | 2/2011 | Zeng | H02J 7/0019 |
| | | | | 320/118 |
| 8,054,044 B2* | 11/2011 | Kang | H02J 7/0016 |
| | | | | 320/118 |
| 8,115,446 B2* | 2/2012 | Piccard | H02J 7/0018 |
| | | | | 320/104 |
| 8,253,378 B2* | 8/2012 | Lee | H02J 7/0019 |
| | | | | 320/118 |
| 8,354,825 B2* | 1/2013 | Lee | H02J 7/0018 |
| | | | | 320/118 |
| 8,436,575 B2* | 5/2013 | Sim | H01M 10/425 |
| | | | | 320/106 |
| 8,536,734 B2* | 9/2013 | Johnson | H02M 7/483 |
| | | | | 307/77 |
| 8,547,065 B2* | 10/2013 | Trigiani | H02J 7/0014 |
| | | | | 320/119 |
| 8,643,500 B2* | 2/2014 | Lee | B60L 58/22 |
| | | | | 340/636.1 |
| 8,692,508 B2* | 4/2014 | Shimizu | H02J 7/0016 |
| | | | | 320/103 |
| 8,692,515 B2* | 4/2014 | Nakao | H02J 7/0016 |
| | | | | 320/116 |
| 8,723,480 B2* | 5/2014 | Lim | H02J 7/0019 |
| | | | | 320/118 |
| 8,766,598 B2* | 7/2014 | Oh | H02J 7/0016 |
| | | | | 320/119 |
| 8,773,070 B2* | 7/2014 | Kang | H02J 7/0016 |
| | | | | 320/118 |
| 8,779,722 B2* | 7/2014 | Lee | H02J 7/0016 |
| | | | | 320/118 |
| 8,796,992 B2* | 8/2014 | Wu | H02J 7/0018 |
| | | | | 320/118 |
| 8,884,580 B2* | 11/2014 | Roeper | H02J 7/0019 |
| | | | | 320/103 |
| 8,902,072 B2* | 12/2014 | Lee | G01R 31/28 |
| | | | | 340/636.1 |
| 8,928,283 B2* | 1/2015 | Nakao | H02J 7/0019 |
| | | | | 320/119 |
| 8,947,048 B2* | 2/2015 | Roessler | H02J 7/0016 |
| | | | | 320/116 |
| 8,970,162 B2* | 3/2015 | Kim | H02J 7/0019 |
| | | | | 320/103 |
| 9,013,148 B2* | 4/2015 | Wu | H02J 7/0026 |
| | | | | 320/118 |
| 9,048,669 B2* | 6/2015 | Lim | H02J 7/0019 |
| 9,142,980 B2* | 9/2015 | Lee | H02J 7/0016 |
| 9,270,132 B2* | 2/2016 | Yun | H02J 7/0016 |
| 9,325,178 B2* | 4/2016 | Yun | H02J 7/0019 |
| 9,337,670 B2* | 5/2016 | Drobnik | H02J 7/0018 |
| 9,490,639 B2* | 11/2016 | Mercier | B60L 58/13 |
| 9,537,328 B2* | 1/2017 | Kim | H02J 7/0014 |
| 9,608,730 B2* | 3/2017 | Sun | H04N 7/17309 |
| 9,620,968 B2* | 4/2017 | Sugeno | H02J 50/60 |
| 9,641,004 B2* | 5/2017 | Floros | H01M 10/441 |
| 9,692,239 B2* | 6/2017 | Drobnik | H02J 7/0021 |
| 9,876,367 B2* | 1/2018 | Trigiani | H02J 7/00306 |
| 9,878,634 B2* | 1/2018 | Sugeno | H02J 7/0019 |
| 9,912,177 B2* | 3/2018 | Von Novak | B60L 11/1866 |
| 10,063,070 B2* | 8/2018 | Hsiao | H02J 7/35 |
| 10,164,442 B2* | 12/2018 | Kaita | H02J 7/0029 |
| 10,176,752 B2* | 1/2019 | Chaji | G09G 3/3266 |
| 10,250,045 B2* | 4/2019 | Sherstyuk | H02J 7/0071 |
| 10,263,434 B2* | 4/2019 | Miyamoto | H01M 10/482 |
| 10,270,262 B2* | 4/2019 | Kim | H02J 7/0018 |
| 10,377,262 B2* | 8/2019 | Hsiao | H02J 7/0016 |
| 10,446,880 B2* | 10/2019 | Sung | H01M 10/44 |
| 10,541,548 B2* | 1/2020 | Kim | H02J 7/0068 |
| 10,571,523 B2* | 2/2020 | Kim | H02J 7/00 |
| 10,629,961 B2* | 4/2020 | Hong | H01M 10/4207 |
| 10,658,849 B2* | 5/2020 | Syouda | G01R 31/3835 |
| 10,680,447 B2* | 6/2020 | Yang | H02J 7/0047 |
| 10,693,198 B2* | 6/2020 | Ito | H01M 10/48 |
| 10,971,763 B2* | 4/2021 | Sung | B60L 50/50 |
| 11,011,917 B2* | 5/2021 | Park | H01M 10/4257 |
| 11,069,923 B2* | 7/2021 | Petrakivskyi | H01M 10/482 |
| 2004/0135544 A1* | 7/2004 | King | B60W 10/26 |
| | | | | 320/116 |
| 2004/0135545 A1* | 7/2004 | Fowler | B60W 10/26 |
| | | | | 320/118 |
| 2008/0086247 A1* | 4/2008 | Gu | H02J 7/0022 |
| | | | | 701/36 |
| 2008/0272736 A1* | 11/2008 | Tien | H02J 7/00309 |
| | | | | 320/126 |
| 2009/0072793 A1* | 3/2009 | Chang | H01M 10/441 |
| | | | | 320/134 |
| 2009/0140694 A1* | 6/2009 | Zeng | H02J 7/0016 |
| | | | | 320/118 |
| 2009/0146610 A1* | 6/2009 | Trigiani | H02J 7/0014 |
| | | | | 320/119 |
| 2009/0267566 A1* | 10/2009 | Yano | B60L 58/22 |
| | | | | 320/118 |
| 2010/0019724 A1 | 1/2010 | Mizutani et al. | |
| 2010/0019732 A1* | 1/2010 | Utsumi | H01M 10/4207 |
| | | | | 320/136 |
| 2010/0026241 A1* | 2/2010 | Kang | H02J 7/0016 |
| | | | | 320/118 |
| 2010/0052615 A1* | 3/2010 | Loncarevic | H02J 7/0016 |
| | | | | 320/118 |
| 2010/0090649 A1* | 4/2010 | Sardat | B60L 58/22 |
| | | | | 320/118 |
| 2010/0117593 A1* | 5/2010 | Piccard | H02J 7/342 |
| | | | | 320/104 |
| 2010/0207579 A1* | 8/2010 | Lee | H02J 7/0018 |
| | | | | 320/120 |
| 2010/0231166 A1* | 9/2010 | Lee | H02J 7/0021 |
| | | | | 320/118 |
| 2011/0084668 A1* | 4/2011 | Nakao | H01M 10/482 |
| | | | | 320/149 |
| 2011/0089897 A1* | 4/2011 | Zhang | H02J 7/0026 |
| | | | | 320/116 |
| 2011/0089898 A1* | 4/2011 | Lee | H02J 7/34 |
| | | | | 320/116 |
| 2011/0115436 A1* | 5/2011 | Zhang | B60L 58/12 |
| | | | | 320/134 |
| 2011/0127962 A1* | 6/2011 | Murao | H02J 7/0016 |
| | | | | 320/118 |
| 2011/0248677 A1* | 10/2011 | Shimizu | H02J 7/0016 |
| | | | | 320/118 |

(56) References Cited

U.S. PATENT DOCUMENTS

| | | | |
|---|---|---|---|
| 2011/0254373 A1* | 10/2011 | Johnson | H02M 7/483 307/77 |
| 2011/0285352 A1* | 11/2011 | Lim | H02J 7/0019 320/118 |
| 2011/0285538 A1* | 11/2011 | Lee | G01R 31/28 340/636.1 |
| 2011/0285539 A1* | 11/2011 | Lee | H01M 10/441 340/636.1 |
| 2012/0025770 A1* | 2/2012 | Suzuki | H01M 10/4207 320/118 |
| 2012/0074895 A1* | 3/2012 | Roeper | H02J 7/0019 320/103 |
| 2012/0074906 A1* | 3/2012 | Kang | H02J 7/0016 320/118 |
| 2012/0086390 A1* | 4/2012 | Lim | H02J 7/0019 320/107 |
| 2012/0119707 A1* | 5/2012 | Utsumi | H01M 10/4207 320/136 |
| 2012/0256488 A1* | 10/2012 | Lim | H01M 10/486 307/43 |
| 2012/0268057 A1* | 10/2012 | Wu | H02J 7/0018 320/103 |
| 2012/0293129 A1* | 11/2012 | Naghshtabrizi | H02J 7/0021 320/118 |
| 2013/0002203 A1* | 1/2013 | Kuraishi | H02J 7/0018 320/134 |
| 2013/0015821 A1* | 1/2013 | Kim | H02J 7/0019 320/128 |
| 2013/0026991 A1* | 1/2013 | Roessler | H02J 7/0016 320/116 |
| 2013/0043842 A1* | 2/2013 | Mercier | B60L 58/14 320/119 |
| 2013/0049457 A1* | 2/2013 | Komatsu | B60L 58/22 307/9.1 |
| 2013/0049698 A1* | 2/2013 | Jung | H02J 7/0086 320/134 |
| 2013/0066572 A1 | 3/2013 | Terashima et al. | |
| 2013/0076310 A1* | 3/2013 | Garnier | H02J 7/342 320/118 |
| 2013/0093248 A1* | 4/2013 | Liu | H02J 7/007 307/77 |
| 2013/0141048 A1 | 6/2013 | Huang et al. | |
| 2013/0187610 A1 | 7/2013 | Hayashi et al. | |
| 2014/0009092 A1* | 1/2014 | Ma | B60L 58/22 318/139 |
| 2014/0028098 A1* | 1/2014 | Trigiani | H02J 7/00302 307/39 |
| 2014/0042974 A1* | 2/2014 | Yang | H02J 7/0014 320/119 |
| 2014/0042980 A1* | 2/2014 | Floros | H01M 10/441 320/134 |
| 2014/0062383 A1* | 3/2014 | Yun | H02J 7/342 320/103 |
| 2014/0084868 A1* | 3/2014 | Yun | H02J 7/0063 320/118 |
| 2014/0197795 A1* | 7/2014 | Crebier | H02J 7/35 320/118 |
| 2014/0232347 A1* | 8/2014 | Drobnik | H02J 7/0021 320/119 |
| 2014/0239878 A1* | 8/2014 | Yun | H02J 7/0019 320/103 |
| 2014/0252847 A1* | 9/2014 | Yang | B60R 16/03 307/9.1 |
| 2014/0266062 A1* | 9/2014 | Lee | H01M 10/48 320/134 |
| 2014/0300325 A1* | 10/2014 | Wu | H02J 7/0026 320/118 |
| 2014/0300364 A1* | 10/2014 | Choi | G01R 31/385 324/426 |
| 2014/0306662 A1* | 10/2014 | Kim | H02J 7/007 320/118 |
| 2014/0347013 A1 | 11/2014 | Kim | |
| 2014/0354212 A1* | 12/2014 | Sugeno | B60L 58/12 320/103 |
| 2015/0214757 A1* | 7/2015 | Zane | H02J 7/0021 320/107 |
| 2015/0269883 A1* | 9/2015 | Chaji | G11C 19/28 345/205 |
| 2015/0357843 A1* | 12/2015 | Kobayashi | H02J 7/0016 320/118 |
| 2016/0043578 A1* | 2/2016 | Miyamoto | H02J 7/0014 320/118 |
| 2016/0197499 A1* | 7/2016 | Kaita | H02J 7/0016 320/103 |
| 2016/0218526 A1* | 7/2016 | Drobnik | H02J 7/0021 |
| 2016/0294476 A1* | 10/2016 | Sun | H04B 10/27 |
| 2016/0308375 A1* | 10/2016 | Pognant-Gros | H02J 7/0014 |
| 2016/0322615 A1 | 11/2016 | Jeong et al. | |
| 2017/0047759 A1 | 2/2017 | Kim | |
| 2017/0098940 A1 | 4/2017 | Syouda | |
| 2017/0144565 A1 | 5/2017 | Sugeno et al. | |
| 2017/0179736 A1 | 6/2017 | Kim et al. | |
| 2017/0271913 A1* | 9/2017 | Nasiri | H02J 7/0021 |
| 2017/0288422 A1* | 10/2017 | Yang | H01M 10/482 |
| 2018/0040922 A1* | 2/2018 | Sung | H01M 10/42 |
| 2018/0145519 A1* | 5/2018 | Trigiani | H02J 7/00306 |
| 2018/0145521 A1* | 5/2018 | Hwang | B60L 58/22 |
| 2018/0233928 A1* | 8/2018 | Li | H01M 10/482 |
| 2018/0309172 A1 | 10/2018 | Ito et al. | |
| 2019/0067755 A1* | 2/2019 | Kim | H01M 10/425 |
| 2019/0180678 A1* | 6/2019 | Chaji | G11C 19/28 |
| 2019/0207396 A1* | 7/2019 | Chen | H02J 7/0021 |
| 2019/0237816 A1* | 8/2019 | Kim | B60L 58/12 |
| 2019/0252735 A1* | 8/2019 | Sung | H01M 10/48 |
| 2019/0260097 A1* | 8/2019 | Kwon | H01M 10/482 |
| 2019/0265304 A1* | 8/2019 | Kim | B60L 50/50 |
| 2019/0356143 A1* | 11/2019 | Lee | G01R 31/3835 |
| 2019/0361075 A1* | 11/2019 | Lee | G01R 31/3835 |
| 2019/0372178 A1* | 12/2019 | Pennisi | G01R 31/54 |
| 2020/0006367 A1* | 1/2020 | Krutzik | H01L 27/11582 |
| 2020/0036194 A1* | 1/2020 | Park | H01M 10/4257 |
| 2020/0106278 A1* | 4/2020 | Sung | H02J 50/40 |
| 2020/0144679 A1* | 5/2020 | Kam | H01M 10/4207 |
| 2020/0343739 A1* | 10/2020 | Peretz | H02J 7/0016 |
| 2021/0083485 A1* | 3/2021 | Sung | H02J 7/0016 |
| 2021/0143765 A1* | 5/2021 | Engst | H02J 7/007194 |

FOREIGN PATENT DOCUMENTS

| | | |
|---|---|---|
| JP | 2011-182558 A | 9/2011 |
| JP | 2012-175734 A | 9/2012 |
| JP | 2014-87084 A | 5/2014 |
| JP | 2014-230488 A | 12/2014 |
| JP | 2016-25820 A | 2/2016 |
| JP | 2017/118813 A | 6/2017 |
| KR | 10-0680901 B1 | 2/2007 |
| KR | 10-2013-0086568 A | 8/2013 |
| KR | 10-2014-0029017 A | 3/2014 |
| KR | 10-1387658 B1 | 4/2014 |
| KR | 10-1486810 B1 | 2/2015 |
| KR | 10-2016-0059193 A | 5/2016 |
| KR | 10-2016-0128162 A | 11/2016 |
| KR | 10-2017-0019971 A | 2/2017 |
| WO | WO 2010/087608 A2 | 8/2010 |
| WO | WO-2011147751 A2 * | 12/2011 ............ H02J 7/0016 |
| WO | WO 2017/002526 A1 | 1/2017 |
| WO | WO-2020022344 A1 * | 1/2020 ............... H02J 7/02 |

OTHER PUBLICATIONS

International Search Report for PCT/KR2018/007651 (PCT/ISA/210) dated Oct. 25, 2018.

* cited by examiner

For Vehicle

Legend
10 - battery module
140 - module connector
152 - second master switching unit
160 - converter
170 - system connector
200 - slave controller
240 - slave connector
251-253 - first to third slave switching units
300 - equalization line
400 - system power module with secondary battery

Legend
10 - battery module
140 - module connector
151 - first master switching unit
152 - second master switching unit
160 - converter
170 - system connector
200 - slave controller
240 - slave connector
251-253 - first to third slave switching units
300 - equalization line
400 - system power module with secondary battery

BATTERY MODULE EQUALIZATION APPARATUS AND BATTERY PACK AND VEHICLE INCLUDING THE SAME

TECHNICAL FIELD

The present disclosure relates to a battery module equalization apparatus and a battery pack and a vehicle including the same, and more particularly, to charge equalization of battery modules in a battery pack including the battery modules.

The present application claims priority to Korean Patent Application No. 10-2017-0125243 filed in the Republic of Korea on Sep. 27, 2017, the disclosures of which are incorporated herein by reference.

BACKGROUND ART

Recently, there is dramatically growing demand for portable electronic products such as laptop computers, video cameras and mobile phones, and with the extensive development of accumulators for energy storage, robots and satellites, many studies are being made on high performance secondary batteries that can be recharged repeatedly.

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages of free charging and discharging, a very low self-discharge rate and high energy density.

Batteries are used in various fields, and in many cases, large capacity is required in the field in which batteries are used so much in recent years such as electric-drive vehicles or smart grid systems. To increase the capacity of battery packs, methods for increasing the capacity of secondary batteries or battery cells themselves may be used, but in this case, disadvantages are that the capacity increase effect is not so large, there is a physical limitation on the size expansion of the secondary batteries and it is not easy to manage. Accordingly, generally, a battery pack including a plurality of battery modules connected in series and in parallel is widely used.

The plurality of battery modules forming the battery pack has a difference in capacity performance between batteries due to the intrinsic properties with the passage of time of usage, different production environments or diverse system applications, and as a result, a terminal voltage difference of a corresponding module or a difference in State Of Charge (SOC) occurs during charging/discharging.

Due to this difference, when the plurality of battery modules having a relative difference in electrical properties operates as the battery pack, the overall charging or discharging capacity of the battery pack may be restricted by a particular battery module with degraded performance, resulting in the aging battery pack and overvoltage.

Uniformly adjusting the terminal voltage between battery modules is referred to as module balancing or charge equalization between modules. However, the conventional charge equalization between modules is difficult to individually select a particular target battery module for module balancing from the plurality of battery modules. Particularly, to implement a charge equalization circuit for individually selecting a particular battery module, the structure becomes complex, and the number or volume of wire harnesses increases. Accordingly, due to these problems, it is not easy to manufacture a module equalization apparatus, it takes a long time to manufacture a module equalization apparatus, and a defect rate may increase.

DISCLOSURE

Technical Problem

The present disclosure is designed to solve the above-described problem and therefore the present disclosure is directed to providing a battery module equalization apparatus that has a simple structure and can effectively perform balancing between modules.

These and other objects and advantages of the present disclosure will be understood by the following description and will be apparent from the embodiments of the present disclosure. Further, it will be readily understood that the objects and advantages of the present disclosure can be realized by the means set forth in the appended claims and combinations thereof.

Technical Solution

To achieve the above-described object, a battery module equalization apparatus according to the present disclosure is an apparatus for charge equalization between a plurality of battery modules connected in series, each battery module including at least one secondary battery, and includes a plurality of slave controllers electrically connected to the plurality of battery modules to measure voltage values of the plurality of battery modules, each slave controller having a slave charging/discharging channel through which the current that charges and discharges each battery module flows, and a master controller configured to receive the voltage value of each battery module from the plurality of slave controllers, select at least one of the plurality of slave controllers based on the received voltage value, and transmit a CHARGE or DISCHARGE command to the at least one selected slave controller, and having a master charging/discharging channel through which the charging current supplied to the at least one slave controller and the discharging current supplied from the at least one slave controller flow.

Additionally, the battery module equalization apparatus may further include a system power module including at least one system power module secondary battery, and electrically connected to the master controller to supply charging power to the master charging/discharging channel or receive discharging power from the master charging/discharging channel.

Additionally, the battery module equalization apparatus may further include a system converter disposed between the plurality of battery modules connected in series and the system power module to change the voltage.

Additionally, the battery module equalization apparatus may further include an equalization line configured to electrically connect the plurality of slave controllers and the master controller, the equalization line through which the charging current and the discharging current flow.

Additionally, the equalization line may include a plurality of unit lines electrically connecting two different slave controllers among the plurality of slave controllers.

Additionally, the plurality of slave controllers may include an odd slave connected to an odd numbered battery module in an order of series connection among the plurality of battery modules, and an even slave connected to an even numbered battery module in an order of series connection among the plurality of battery modules, and the unit line may include an odd line connecting each connector provided in the odd slave, and an even line connecting each connector provided in the even slave.

Additionally, the master controller may include a switching unit disposed on the master charging/discharging channel and having a plurality of switches to open/close the master charging/discharging channel, and open/close at least one of the plurality of switches included in the switching unit based on the voltage value of each battery module.

Additionally, the plurality of slave controller may include a switching unit disposed on the slave charging/discharging channel, and having a plurality of switches to open/close the slave charging/discharging channel.

Additionally, the master controller may select at least one target battery module for equalization from the plurality of battery modules, and control the switching unit by the slave controller directly connected to the selected battery module.

Additionally, the plurality of slave controllers may include a first group slave connected to two or more battery modules connected in series on one side among the plurality of battery modules, and a second group slave connected to two or more other battery modules connected in series among the plurality of battery modules to a battery module connected to the first group slave, and the master controller may include a first module connector connected to the first group slave, and a second module connector connected to the second group slave.

Additionally, the master controller may be configured to transmit the charging/discharging power from a slave controller belonging to one of the first group slave and the second group slave to a slave controller belonging to a different group.

Additionally, the master charging/discharging channel may include a first unit channel connected to the first module connector, and a second unit channel connected to the second module connector, and the first unit channel and the second unit channel may be connected in parallel.

Additionally, to achieve the above-described object, a battery pack according to the present disclosure includes the battery module equalization apparatus according to the present disclosure.

Additionally, to achieve the above-described object, a vehicle according to the present disclosure includes the battery module equalization apparatus according to the present disclosure.

Advantageous Effects

According to the present disclosure, in individually selecting a target battery module for charging/discharging for charge equalization between battery modules, the connector is simple and the volume of wire harness reduces, so it easy to manufacture a battery pack and it is possible to easily reduce the size.

Additionally, in individually selecting a battery module, the structure of lines connected to the battery module is simple, and fast charge equalization between battery modules is achieved.

Additionally, in the case of the battery module equalization apparatus according to the present disclosure, it is possible to easily transmit energy between battery modules without connection to an external source of power, thereby simplifying the charge equalization circuit.

The present disclosure may have a variety of different other effects, and these and other effects can be understood by the following description and will be apparent from the embodiments of the present disclosure.

BRIEF DESCRIPTION OF THE DRAWINGS

The accompanying drawings illustrate a preferred embodiment of the present disclosure, and together with the detailed description of the present disclosure described below, serve to provide a further understanding of the technical aspects of the present disclosure, and thus the present disclosure should not be construed as being limited to the drawings.

MODE FOR CARRYING OUT THE INVENTION

Figure 1:
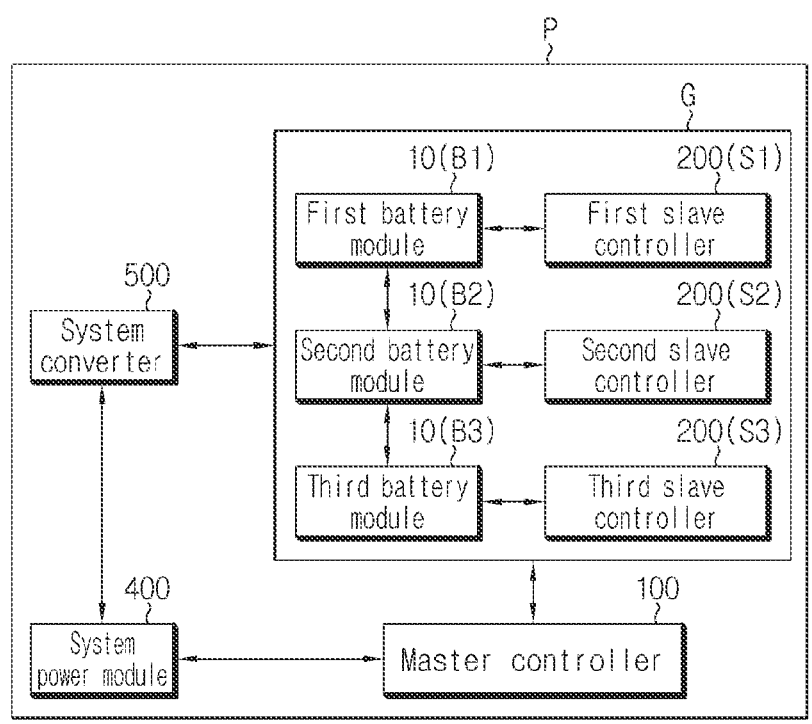
FIG. 1 is a schematic block diagram showing the configuration of a battery module equalization apparatus according to an embodiment of the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but interpreted based on the meanings and concepts corresponding to the technical aspects of the present disclosure on the basis of the principle that the inventor is allowed to define the terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and modifications could be made thereto at the time of filing the application.

FIG. 1 is a schematic block diagram showing the configuration of a battery module equalization apparatus according to an embodiment of the present disclosure.

Referring to FIG. 1, a battery pack P to which the battery module equalization apparatus according to an embodiment of the present disclosure is applied may include at least one battery module 10. Particularly, the battery pack P may include a plurality of battery modules 10, and each battery module 10 may be electrically connected in series and/or in parallel. Accordingly, the output and/or capacity of the battery pack P may be increased by the electrical connection of the battery modules 10.

Here, each battery module 10 may include at least one secondary battery. Particularly, each battery module 10 may include a plurality of secondary batteries, an in this case, the plurality of secondary batteries provided in each battery module 10 may be electrically connected to each other to increase the output and/or capacity of the battery modules 10.

Additionally, the battery pack P to which the battery module equalization apparatus according to the present disclosure is applied may be mounted in a vehicle. That is, the battery pack P in which the battery module equalization apparatus according to the present disclosure is employed may be an automobile battery pack P. Here, the vehicle may be a car that is supplied with power for driving or power for operating the electrical accessories such as audio or an air conditioner by the battery pack P.

Particularly, the car to which the battery module equalization apparatus according to the present disclosure is applied may be a car that is supplied with power from the battery pack P, for example, an electric vehicle, also called an EV, or a hybrid vehicle, also known as HEV and PHEV.

As shown in FIG. 1, the battery module equalization apparatus according to the present disclosure may include a slave controller 200 and a master controller 100.

The slave controller 200 may be electrically connected to each of the plurality of battery modules 10 included in the battery pack P. That is, the slave controller 200 may be separately provided and connected to each battery module 10. Accordingly, a plurality of slave controllers 200 may be included in the battery module equalization apparatus. Particularly, the slave controllers 200 may be provided in a one-to-one matching relationship with the battery modules 10.

For example, as shown in the configuration of FIG. 1, when the plurality of battery modules 10, i.e., a first battery module B1, a second battery module B2 and a third battery module B3, is connected in series, each one separate slave controller 200 may be electrically connected to each battery module 10. That is, a first slave controller S1 may be connected to the first battery module B1, a second slave controller S2 may be connected to the second battery module B2, and a third slave controller S3 may be connected to the third battery module B3.

As the slave controller 200 is connected to at least one battery module 10 as described above, the slave controller 200 may obtain information from the connected battery module 10, in other words, the corresponding battery module 10, or may perform control operation of the corresponding battery module 10.

Moreover, the slave controller 200 may measure a voltage value of the battery module 10 connected to the corresponding slave controller 200, i.e., the corresponding battery module 10.

For example, in the configuration of FIG. 1, the first slave controller S1 may measure a voltage value of the first battery module B1 connected thereto, and the second slave controller S2 may measure a voltage value of the second battery module B2 connected thereto. Here, the slave controller 200 may measure the overall voltage of the battery module 10, and may measure the voltage across two ends of each battery cell provided in the battery module 10, in other words, each secondary battery.

Particularly, in the battery module equalization apparatus according to the present disclosure, the slave controller 200 may have a slave charging/discharging channel. Here, the slave charging/discharging channel may be a channel configured to allow the charging and discharging current to flow in the battery module 10 connected to the corresponding slave controller 200.

The slave controller 200 may be implemented as an electronic device such as a Battery Management System (BMS) that controls the charging/discharging of the battery module. The slave controller 200 may be interchangeably used with a variety of other terms such as a Cell Module Controller (CMC).

According to an embodiment of the present disclosure, the battery module equalization apparatus may include a battery group G including the plurality of battery modules 10 and the plurality of slave controllers 200 each connected to the plurality of battery modules 10. The battery group G will be described in detail below.

The master controller 100 may be electrically connected to the battery group G. Particularly, the master controller 100 may transmit and receive a communication signal or power to/from the plurality of slave controllers 200 included in the battery group G.

The master controller 100 may receive the voltage value of each battery module 10 from the plurality of slave controllers 200. That is, when each slave controller 200 measures the voltage value of the corresponding battery module 10, the measured information may be transmitted from each slave controller 200 to the master controller 100. Here, the master controller 100 may calculate the State of Charge (SOC) based on the voltage value received from the slave controller 200.

In this instance, the master controller 100 may select a slave controller 200 connected to a target battery module 10 for equalization based on the voltage value or the State of Charge (SOC) of the battery modules 10 each connected to the plurality of slave controllers 200.

For example, in the configuration of FIG. 1, when among the plurality of battery modules 10, the voltage value of the first battery module B1 and the third battery module B3 is 5V, and the voltage value of the second battery module B2 is 3V, the master controller 100 may set the second battery module B2 as a target for equalization, and select the second slave controller S2 connected to the second battery module B2.

Additionally, when among the plurality of battery modules 10, the voltage value of the first battery module B1 and the third battery module B3 is 5V, and the voltage value of the second battery module B2 is 7V, the master controller 100 may set the second battery module B2 as a target for equalization, and select the second slave controller S2 connected to the second battery module B2.

When the master controller 100 selects a certain slave controller 200 based on the voltage value of each battery module 10, the master controller 100 may transmit a CHARGE or DISCHARGE command to the at least one selected slave controller 200.

For example, of the two embodiments in which the second battery module B2 is set as a target for equalization, in the case of the first embodiment in which the voltage value of the second battery module B2 is 3V, because the voltage value of the second battery module B2 is lower than that of the other battery module, the master controller 100 may set the second battery module B2 as a target for equalization that needs to be charged. Additionally, the master controller 100 may transmit a CHARGE command to the second slave controller S2.

Additionally, of the two embodiments in which the second battery module B2 is set as a target for equalization, in the second embodiment in which the voltage value of the second battery module B2 is 7V, because the voltage value of the second battery module B2 is higher than that of the other battery module, the master controller 100 may set the second battery module B2 as a target for equalization that needs to be discharged. Additionally, the master controller 100 may transmit a DISCHARGE command to the second slave controller S2.

When the master controller 100 transmits the CHARGE or DISCHARGE command for the target battery module 10 to at least one slave controller 200, a wired or wireless communication network with the plurality of slave controllers 200 may be used.

Particularly, in the battery module equalization apparatus according to the present disclosure, the master controller 100 may have a master charging/discharging channel. Here, the master charging/discharging channel may be a channel through which the charging current supplied to at least one slave controller 200 flows and the discharging current supplied from at least one slave controller 200 flows.

The master controller 100 may be configured to control the slave controller 200, and may be implemented as an electronic device such as a Battery Management System (BMS) or an Electronic Control Unit (ECU). Additionally, the master controller 100 may be interchangeably used with a variety of other terms such as a Battery Management Controller (BMC).

Preferably, as shown in FIG. 1, the battery module equalization apparatus according to the present disclosure may further include a system power module 400. The system power module 400 may include at least one secondary battery.

For example, the system power module 400 may include 12V or 24V lead storage batteries or lithium secondary batteries that supply the power for operating the electrical accessories of the vehicle such as audio or an air conditioner.

Particularly, the system power module 400 may be electrically connected to the master controller 100 to transmit and receive the charging/discharging power to/from the master controller 100. That is, the system power module 400 may supply the charging power to the master charging/discharging channel provided in the master controller 100, or receive the discharging power from the master charging/discharging channel.

In this instance, the system power module 400 may supply the charging power to the charging target battery module 10 through the master charging/discharging channel provided in the master controller 100 and the slave charging/discharging channel provided in the slave controller 200.

Additionally, the system power module 400 may be supplied with the discharging power from the discharging target battery module 10 through the master charging/discharging channel and the slave charging/discharging channel.

Additionally, preferably, the battery module equalization apparatus according to the present disclosure may further include a system converter 500 as shown in FIG. 1.

The system converter 500 may change the voltage. Particularly, the system converter 500 may be disposed between the plurality of battery modules 10 connected in series and/or in parallel and the system power module 400. Additionally, the system converter 500 may change the voltage between the battery modules 10 and the system power module 400.

The system converter 500 may change the direct current voltage between two ends of the battery group G including the plurality of battery modules 10 connected in series and the system power module 400. For example, the system converter 500 may reduce the magnitude of voltage across two ends of the plurality of battery modules connected in series and transmit it to the system power module 400.

Alternatively, the system converter 500 may increase the magnitude of voltage of the system power module 400 and transmit it to two ends of the plurality of battery modules. More specifically, the system converter 500 may change the voltage between the battery group voltage 400V and the system power module voltage 12V.

The system converter 500 may be implemented as a variety of devices that can change the voltage, known at the time of filing a patent application. For example, the system converter 500 may be implemented in a manner of including a system insulation DC-DC converter that changes the direct current voltage.

Figure 2:
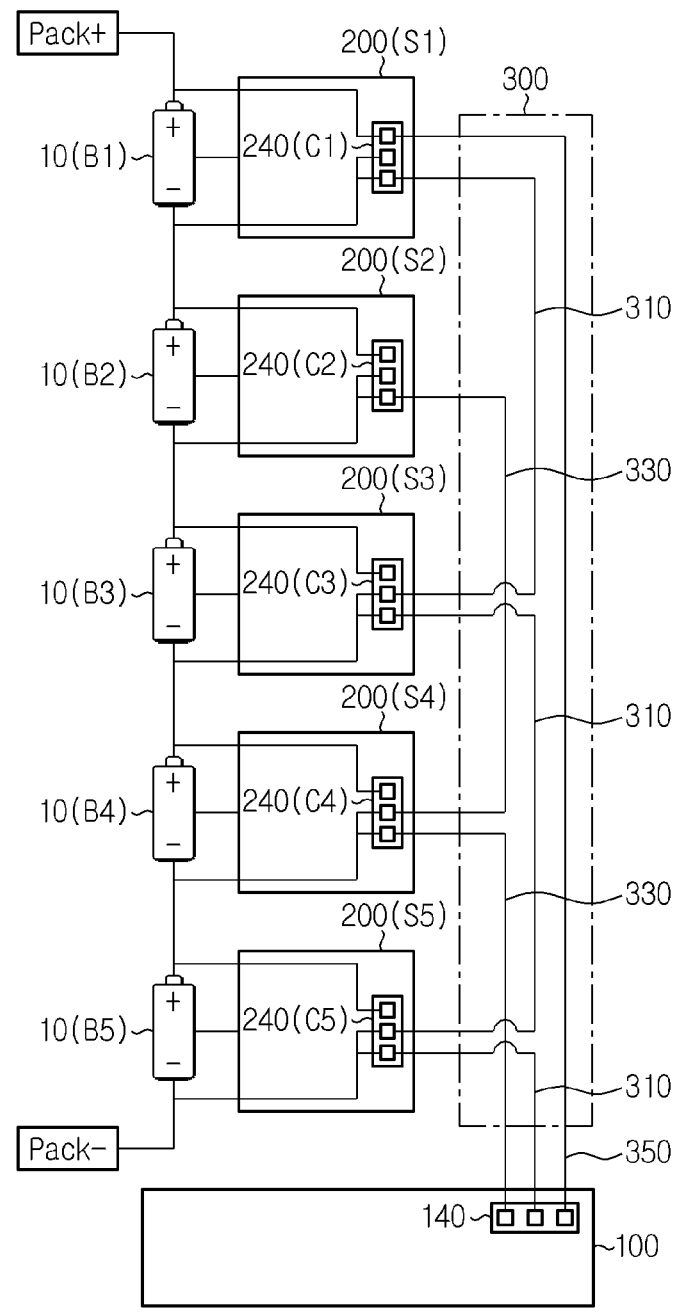
FIG. 2 is a schematic diagram showing the connection configuration of a battery module equalization apparatus according to an embodiment of the present disclosure.

FIG. 2 is a schematic diagram showing the connection configuration of the battery module equalization apparatus according to an embodiment of the present disclosure.

Referring to FIG. 2, the battery module equalization apparatus according to an embodiment of the present disclosure may further include an equalization line 300.

The equalization line 300 may electrically connect the plurality of slave controllers 200 each connected to the plurality of battery modules 10 and the master controller 100 directly. Accordingly, the equalization line 300 may allow power transmission between at least one of the plurality of slave controllers 200 and the master controller 100.

The equalization line 300 may be configured to allow the charging current to flow into the slave controller 200 connected to the charging target battery module 10 from the master controller 100, and the discharging current to flow out toward the master controller 100 from the slave controller 200 connected to the discharging target battery module 10.

The master controller 100 and the slave controller 200 may have a connector as a terminal for connection with the equalization line 300.

For example, in the embodiment of FIG. 2, the master controller 100 may have the module connector 140 as a terminal for connection to the equalization line 300. Additionally, the slave controller 200 may have a slave connector 240 as a terminal for connection to the equalization line 300.

Preferably, the equalization line 300 may include a plurality of unit lines. Here, the unit line is a line that electrically connects two different slave controllers 200 among the plurality of slave controllers 200. Here, the equalization line 300 may directly connect the two different slave controllers 200, and directly connect the last connected slave controller 200 and the master controller 100.

For example, as shown in FIG. 2, when the battery pack includes five battery modules 10, each battery module 10 is referred to as first to fifth battery modules B1~B5 in the direction from the positive electrode (Pack+) of the battery pack to the negative electrode (Pack−). Additionally, the slave controllers 200 connected to the first to fifth battery modules are referred to as first to fifth slave controllers S1~S5 respectively. In this case, in the equalization line 300, one-unit line may directly connect two different slave controllers 200, the first slave controller S1 and the third slave controller S3, and other unit line may directly connect the third slave controller S3 and the fifth slave connector C5. Additionally, another unit line may directly connect the last connected fifth slave connector C5 and the master controller 100.

Additionally, in the equalization line 300, a different unit line may directly connect the second slave controller S2 and the fourth slave controller S4, and other unit line may directly connect the last connected fourth slave controller S4 and the master controller 100.

According to an embodiment of the present disclosure, the plurality of slave controllers 200 may have an odd numbered slave connected to the battery module 10 located at the odd position in the order of series connection from the positive electrode (Pack+) side of the battery pack among the plurality of battery modules 10, and an even numbered slave connected to the battery module 10 located in the even position in the order of series connection from the positive electrode (Pack+) side of the battery pack among the plurality of battery modules 10.

For example, in the embodiment of FIG. 2, the odd numbered slave may include the first, third and fifth slave controllers S1, S3, S5 directly connected to the first, third and fifth battery modules B1, B3, B5 located at the odd position in the order of series connection from the positive electrode (Pack+) side of the battery pack. Additionally, the even numbered slave may include the second and fourth slave controllers S2, S4 directly connected to the second and fourth battery modules B2, B4 located at the even position in the order of series connection from the positive electrode (Pack+) side of the battery pack.

In this configuration, the unit line may include an odd line 310 connecting each slave connector 240 provided in the odd numbered slave, and an even line 330 connecting each slave connector 240 provided in the even numbered slave.

That is, the odd line 310 may be a line connecting the odd numbered slave controllers 200 or the odd numbered slave controller 200 and the master controller 100. Additionally, the even line 330 may be a line connecting the even numbered slave controllers 200 or the even numbered slave controller 200 and the master controller 100. Here, a plurality of odd lines 310 and a plurality of even lines 330 may be provided.

For example, the odd line 310 may include two unit lines that directly connect the first slave connector C1 of the first slave controller S1 and the third slave connector C3 of the third slave controller S3, and directly connect the third slave connector C3 of the third slave controller S3 and the fifth slave connector C5 of the fifth slave controller S5. Additionally, the odd line 310 may directly connect the fifth slave connector C5 and the module connector 140 provided in the master controller 100.

Meanwhile, the even line 330 may include one-unit line that directly connects the second slave connector C2 of the second slave controller S2 and the fourth slave connector C4 of the fourth slave controller S4. Additionally, the even line 330 may directly connect the fourth slave connector C4 and the module connector 140 provided in the master controller 100.

Particularly, the odd line 310 and the even line 330 may be connected to the negative electrode terminal among the plurality of connector terminals provided in each slave connector 240. Here, the negative electrode terminal may be a connector terminal to which a line connected to the negative electrode (−) of the battery module 10 is connected. That is, one end of the odd line 310 and the even line 330 may be connected to the negative electrode terminal of the slave connector 240. Additionally, the other end of the odd line 310 and the even line 330 may be connected to the negative electrode terminal of another slave controller 200 or the module connector 140 of the master controller 100. In this instance, the module connector 140 of the master controller 100 may have at least two connector terminals each connected to different lines, and the odd line 310 and the even line 330 may be each connected to different connector terminals of the module connector 140.

Additionally, the equalization line 300 may include an auxiliary line 350 directly connecting the first slave connector C1 provided in the first slave controller S1 and the module connector 140 provided in the master controller 100. That is, the auxiliary line 350 may be a line electrically connecting the slave controller 200 farthest away from the master controller 100 among the slave controllers 200 connected to the master controller 100 through the odd line 310 or the even line 330 and the master controller 100.

For example, in the configuration of FIG. 2, among the first to fifth slave controllers S1~S5 each connected to the first to fifth battery modules B1~B5 connected in series, the fifth slave controller S5 may be directly connected to the master controller 100 through the odd line 310, and the fourth slave controller S4 may be directly connected to the master controller 100 through the even line 330. In contrast, the first slave controller S1 may be indirectly connected to the master controller 100 via the fifth slave controller S5 and the third slave controller S3 through the odd line 310. Accordingly, one end of the auxiliary line 350 may be connected to the first slave connector C1 of the first slave controller S1, and the other end of the auxiliary line 350 may be connected to the module connector 140 of the master controller 100.

Particularly, dissimilar to the odd line 310 and the even line 330, the auxiliary line 350 may be connected to the positive electrode terminal among the plurality of connector terminals provided in the slave connector 240. Here, the positive electrode terminal may be a connector terminal to which a line connected to the positive electrode (+) of the battery module 10 is connected. That is, in the above embodiment, the auxiliary line 350 may have one end connected to the positive electrode terminal of the first slave connector C1. Additionally, the auxiliary line 350 may have the other end connected to other connector terminal not connected to the odd line 310 and the even line 330 among the plurality of connector terminals provided in the module connector 140.

By this configuration, the odd line 310, the even line 330 and the auxiliary line 350 may allow power transmission between at least one slave controller 200 and the master controller 100.

For example, the charging current flowing into the slave controller 200 connected to the charging target battery module 10 may flow in the odd line 310, the even line 330 or the auxiliary line 350. Additionally, the discharging current flowing out of the slave controller 200 connected to the discharging target battery module 10 may flow in the odd line 310, the even line 330 or the auxiliary line 350.

Figure 3:
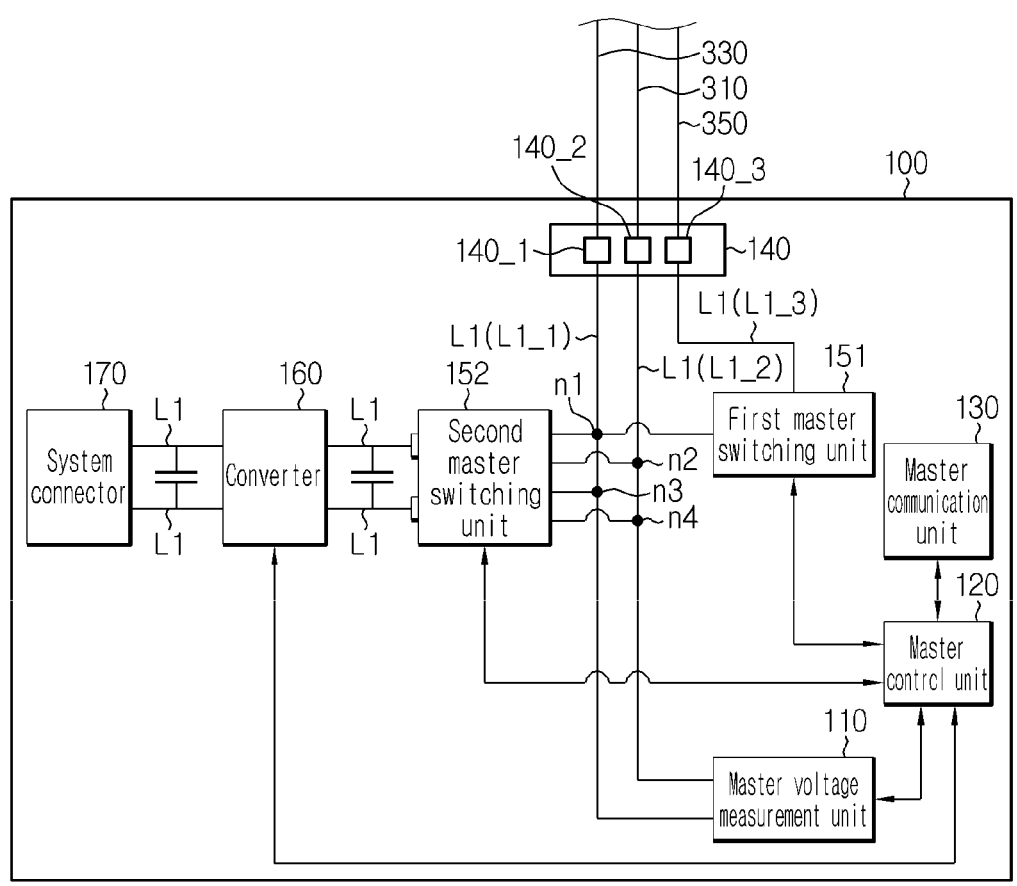
FIG. 3 is a schematic diagram showing the detailed configuration of a master controller according to an embodiment of the present disclosure.

FIG. 3 is a schematic diagram showing the detailed configuration of the master controller according to an embodiment of the present disclosure.

Referring to FIG. 3, the master controller 100 according to an embodiment of the present disclosure may include a master control unit 120, a master voltage measurement unit 110, a master communication unit 130, a system connector 170, a module connector 140, a converter 160, a master charging/discharging channel L1 and a master switching unit 150 (a first master switching unit 151 and a second master switching unit 152).

The system connector 170 and the module connector 140 may electrically connect the master controller 100 and an electrical device or wire outside the master controller 100.

For example, the system connector 170 may allow electrical connection of a wire directly connecting the master controller 100 and the system power module 400. Additionally, the module connector 140 may be electrically connected to the equalization line 300 connecting the plurality of slave controllers 200 and the master controller 100, i.e., the odd line 310, the even line 330 and the auxiliary line 350.

Particularly, the module connector 140 may have three or more connector terminals. Additionally, each connector terminal may be connected to the unit line provided in the equalization line 300.

For example, the module connector 140 may have an odd terminal 140_2, an even terminal 140_1 and an auxiliary terminal 140_3. Additionally, each connector terminal may be connected to different lines of the equalization line 300. That is, the odd terminal 140_2 may be connected to the odd line 310, the even terminal 140_1 may be connected to the even line 330, and the auxiliary terminal 140_3 may be connected to the auxiliary line 350.

Meanwhile, the connector terminal may be connected to the end of the master charging/discharging channel L1. That is, when the module connector 140 has three connector terminals, each connector terminal may be connected to different current channels provided in the master charging/discharging channel L1.

For example, as shown in the configuration of FIG. 3, the master charging/discharging channel L1 may include an odd channel L1_2, an even channel L1_1 and an auxiliary channel L1_3, and the odd channel L1_2 may be connected to the odd terminal 140_2, the even channel L1_1 may be connected to the even terminal 140_1, and the auxiliary channel L1_3 may be connected to the auxiliary terminal 140_3.

The master charging/discharging channel L1 may allow the charging/discharging current to flow between the slave controller 200 and the system power module 400. Additionally, the master charging/discharging channel L1 may allow the charging/discharging current to flow between two different slave controllers 200. More specifically, the master charging/discharging channel L1 may provide a current flow channel for the charging/discharging power supply between the module connector 140 and the system connector 170 within the master controller 100.

Moreover, the master charging/discharging channel L1 may include the odd channel L1_2, the even channel L1_1 and the auxiliary channel L1_3 as previously described. Particularly, the odd channel L1_2, the even channel L1_1 and the auxiliary channel L1_3 may be connected to the module connector 140.

The master control unit 120 may communicate with each component included in the master controller 100, and control each component included in the master controller 100. For example, the master control unit 120 may include a Micro Controller Unit (MCU) to perform this operation.

The master communication unit 130 may communicate with the slave controller 200, and transmit and receive various pieces of data to/from the slave controller 200. In this instance, the master communication unit 130 may connect the slave controller 200 and the master controller 100 using various types of wired or wireless communication networks.

For example, the master communication unit 130 may transmit the voltage value of the battery module 10 received from the slave controller 200 to the master control unit 120, and transmit the CHARGE command or DISCHARGE command received from the master control unit 120 to at least one slave controller 200 selected from the master control unit 120. In this instance, the master control unit 120 may select at least one target slave controller 200 for equalization based on the voltage value or the SOC of the battery module 10 received from the slave controller 200.

The converter 160 may change the voltage. To this end, the converter 160 may include various types of electronic devices or elements for changing the voltage. For example, the converter 160 may include an insulation DC-DC converter that changes the direct current voltage.

In this instance, the converter 160 may be directly electrically connected to the system connector 170 to change the direct current voltage to transmit the power received from the system power module 400 to the charging target battery module 10. Additionally, the converter 160 may change the direct current voltage to transmit the power received from the discharging target battery module 10 to the system power module 400.

The master charging/discharging channel L1 may have a node on the master charging/discharging channel L1. That is, the node may be a contact point at which two or more channels connecting the components within the master controller 100 are connected to each other.

For example, in the embodiment of FIG. 3, the master charging/discharging channel L1 may have a first node n1, a second node n2, a third node n3 and a fourth node n4 on the master charging/discharging channel L1. Here, the first node n1 and the third node n3 may be provided on the even channel L1_1. Particularly, the first node n1 may be a contact point at which the auxiliary channel L1_3 and the even channel L1_1 contact. Additionally, the second node n2 and the fourth node n4 may be provided on the odd channel L1_2.

The master switching unit 150 may be provided on the master charging/discharging channel L1 to open/close the electricity channel. Particularly, the master switching unit 150 may include the first master switching unit 151 and the second master switching unit 152.

For example, as shown in the configuration of FIG. 3, the first master switching unit 151 may be provided on the auxiliary channel L1_3 to open/close the flow of the charging/discharging current flowing between the auxiliary terminal 140_3 and the first node n1.

Additionally, the second master switching unit 152 may be connected, on one side, to four channels connected to the first node n1, the second node n2, the third node n3 and the fourth node n4, and may be connected, on the other side, to a channel connecting the second master switching unit 152 and the converter 160. In this configuration, the second master switching unit 152 may open/close the flow of the charging/discharging current flowing in four channels each connected from the first node n1, the second node n2, the third node n3 and the fourth node n4.

Particularly, in the battery module equalization apparatus according to the present disclosure, the four channels each running from the first node n1, the second node n2, the third node n3 and the fourth node n4 to the second master switching unit 152 may be combined into two channels through the second master switching unit 152 and connected to the converter 160. That is, the two channels running from the first node n1 and the second node n2 may be combined into one channel. Additionally, the two channels running from the third node n3 and the fourth node n4 may be combined into one channel.

The first master switching unit 151 and the second master switching unit 152 may have a switch to open/close the electricity line. Here, the switching operation of the master switching unit 150 may be performed according to an OPEN/CLOSE command received from the master control unit 120. That is, the master control unit 120 may transmit the OPEN/CLOSE command to the first master switching unit 151 and the second master switching unit 152 based on the voltage value or the SOC of the battery module 10 received from the slave controller 200.

The master voltage measurement unit 110 may measure the voltage of the equalization line 300. That is, the master voltage measurement unit 110 may be provided on the master charging/discharging channel L1 to measure the voltage of the odd channel L1_2, the even channel L1_1 and the auxiliary channel L1_3 each connected to the equalization line 300, i.e., the odd line 310, the even line 330 and the auxiliary line 350.

For example, in the embodiment of FIG. 3, the master voltage measurement unit 110 may be connected to the odd channel L1_2 and the even channel L1_1. That is, the odd channel L1_2 may connect the odd terminal 140_2 and the master voltage measurement unit 110. Additionally, the even channel L1_1 may connect the even terminal 140_1 and the master voltage measurement unit 110.

In this configuration, the master voltage measurement unit 110 may measure the voltage between the even channel L1_1, the odd channel L1_2 and the auxiliary channel L1_3 according to a situation in which the current flow by the switching configuration of the master switching unit 150. For example, the master voltage measurement unit 110 may measure the voltage of the even channel L1_1, the odd channel L1_2 and/or the auxiliary channel L1_3 by measuring the voltage between one of the first node n1 and the third node n3 and one of the second node n2 and the fourth node n4. In this instance, the master voltage measurement unit 110 may transmit the measured information to the master control unit 120. Then, the master control unit 120 may diagnose if the equalization line 300 operates normally, using the voltage of the equalization line 300 measured by the master voltage measurement unit 110.

Figure 4:
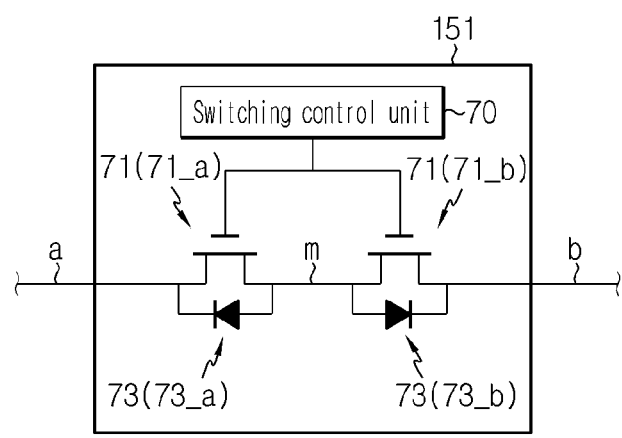
FIG. 4 is a schematic circuit diagram showing the configuration of a first master switching unit according to an embodiment of the present disclosure.

FIG. 4 is a schematic circuit diagram showing the configuration of the first master switching unit according to an embodiment of the present disclosure. For example, the configuration of FIG. 4 may be applied to the first master switching unit 151 included in FIG. 3.

Referring to FIG. 4, the first master switching unit 151 according to an embodiment of the present disclosure may include a main line m, a Field Effect Transistor (FET) 71, a diode 73, and a switching control unit 70.

The main line m may be configured to allow the charging/discharging current to flow between a first direction line a and a second direction line b. That is, the charging/discharging current may flow into the first master switching unit 151 from the second direction line b, and flow out toward the first direction line through a through the main line m.

Additionally, the charging/discharging current may flow into the first master switching unit 151 from the first direction line a, and flow out toward the second direction line b through the main line m. Here, the first direction line a, the second direction line b and the main line m may be the auxiliary channel L1_3 shown in FIG. 3.

The first master switching unit 151 may be connected to different components provided in the master controller 100 through the first direction line a and the second direction line b.

The first master switching unit 151 may include at least one FET 71. That is, the FET 71 may be provided on the main line m to adjust the current conduction. For example, as shown in the configuration of FIG. 4, the first master switching unit 151 may include a first direction FET 71_a connecting the first direction line a to the main line m, and a second direction FET 71_b connecting the second direction line b to the main line m. Here, the first direction FET 71_a may adjust the conduction of the charging/discharging current flowing between the main line m and the first direction line a. Additionally, the second direction FET 71_b may adjust the conduction of the charging/discharging current flowing between the main line m and the second direction line b.

The first direction FET 71_a and the second direction FET 71_b may be selectively turned on or off. The first direction FET 71_a and the second direction FET 71_b are a Field Effect Transistor (FET) device having gate, drain and source terminals, and they are turned on or off depending on whether or not a channel is formed based on the voltage applied between the gate terminal and the source terminal. For example, the FET 71 may be a Metal Oxide Semiconductor Field Effect Transistor (MOSFET).

The first direction FET 71_a and the second direction FET 71_b may have a first direction diode 73_a and a second direction diode 73_b respectively. The diode 73 is connected to the FET 71 in parallel, and acts as a rectifier to enable the current conduction in one direction.

For example, as shown in the configuration of FIG. 4, the first direction diode 73_a may be connected to the first direction FET 71_a in parallel to enable the current conduction in the direction of the first direction line a from the main line m. Additionally, the second direction diode 73_b may be connected to the second direction FET 71_b in parallel to enable the current conduction in the direction of the second direction line b from the main line m.

The switching control unit 70 may control the first direction FET 71_a and the second direction FET 71_b. Specifically, the switching control unit 70 may selectively turn on or off the first direction FET 71_a and the second direction FET 71_b by applying a predetermined voltage to the first direction FET 71_a or the second direction FET 71_b. In this instance, the master control unit 120 shown in FIG. 3 may transmit an OPEN/CLOSE command for the first direction FET 71_a and the second direction FET 71_b to the switching control unit 70.

For example, in the embodiment of FIG. 4, when the switching control unit 70 receives an OPEN/CLOSE command for turning on the first direction FET 71_a and turning off the second direction FET 71_b, the switching control unit 70 may close the first direction FET 71_a, and open the second direction FET 71_b. Through this, the first master switching unit 151 may adjust the current direction of the current flowing from the first direction line a to the second direction line b through the first direction FET 71_a, the main line m, and the second direction diode 73_b.

Additionally, when the switching control unit 70 receives an OPEN/CLOSE command for turning off the first direction FET 71_a and turning on the second direction FET 71_b, the switching control unit 70 may open the first direction FET 71_a and close the second direction FET 71_b. Through this, the first master switching unit 151 may adjust the current direction of the current flowing from the second direction line b to the first direction line a through the second direction FET 71_b, the main line m, and the first direction diode 73_a.

Figure 5:
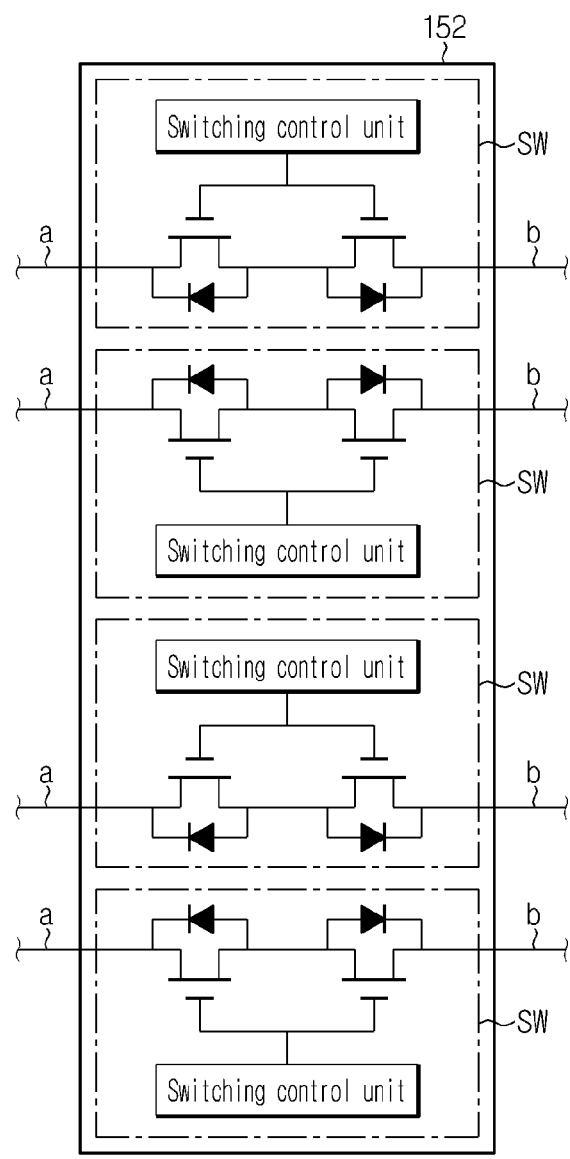
FIG. 5 is a schematic circuit diagram showing the configuration of a second master switching unit according to an embodiment of the present disclosure.

FIG. 5 is a schematic circuit diagram showing the configuration of the second master switching unit according to an embodiment of the present disclosure. For example, the configuration of FIG. 5 may be applied to the second master switching unit 152 included in FIG. 3.

Referring to FIG. 5, the second master switching unit 152 according to an embodiment of the present disclosure may have a plurality of switching modules sw. In this instance, the plurality of switching modules sw may open/close a plurality of lines passing through the second master switching unit 152. That is, the plurality of switching modules sw may be each disposed on the plurality of lines to open/close the plurality of lines.

For example, as shown in the configuration of FIG. 5, the second master switching unit 152 may have four switching modules sw. In this instance, the switching modules sw may be each disposed on four lines passing through the second master switching unit 152.

Here, the four lines passing through the second master switching unit 152 may be four lines connecting the second master switching unit 152 and the first node n1, the second node n2, the third node n3 and the fourth node n4 shown in FIG. 3. Additionally, each of the plurality of switching modules sw may be configured with a similar structure to the first master switching unit 151 shown in FIG. 4. Accordingly, the description of FIG. 4 previously provided may be applied equally or similarly to each switching module sw of the second master switching unit 152, and its related detailed description is omitted herein.

The second master switching unit 152 may selectively turn on or off the plurality of switching modules sw. That is, the second master switching unit 152 may selectively open/close the plurality of lines by selectively turning on or off the plurality of switching modules sw.

Here, a detailed description of the process of adjusting the current conduction and the current direction at each switching module sw may be the same as described above in the description of the first master switching unit 151 of FIG. 4.

Figure 6:
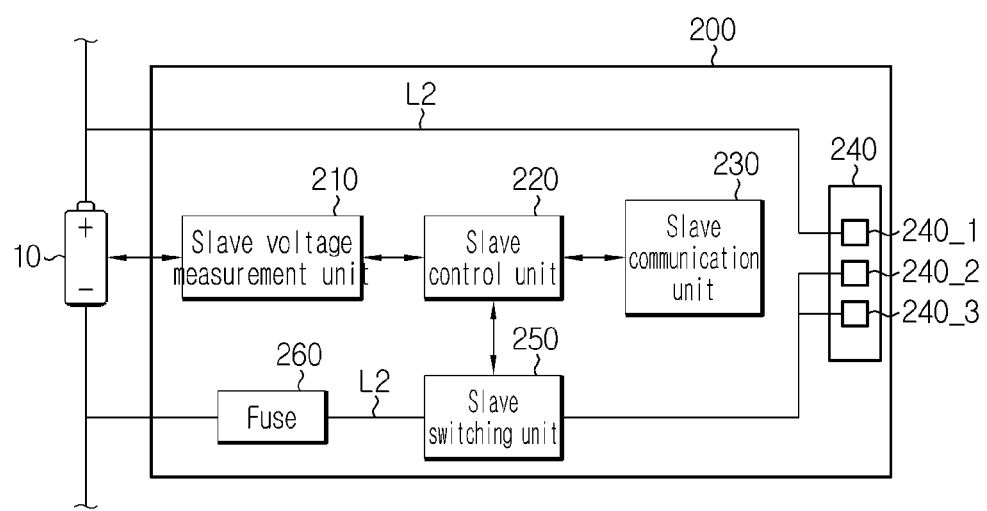
FIG. 6 is a schematic diagram showing the detailed configuration of a slave controller according to an embodiment of the present disclosure.

FIG. 6 is a schematic diagram showing the detailed configuration of the slave controller according to an embodiment of the present disclosure.

Referring to FIG. 6, the slave controller 200 according to an embodiment of the present disclosure may include a slave control unit 220, a slave voltage measurement unit 210, a slave communication unit 230, a slave connector 240, a slave charging/discharging channel L2, a slave switching unit 250, and a fuse 260.

The slave control unit 220 may communicate with each component included in the slave controller 200, and control each component included in the slave controller 200. For example, the slave control unit 220 may include a Micro Controller Unit (MCU) to perform this operation.

The slave voltage measurement unit 210 may measure a voltage value of the battery module 10 directly connected to the slave controller 200. For example, the slave voltage measurement unit 210 may measure the overall voltage of the battery module 10, and may measure the voltage across two ends of each battery cell provided in the battery module 10, in other words, each secondary battery. Additionally, the slave voltage measurement unit 210 may transmit the voltage value of the battery module 10 or the voltage value of the battery cell to the slave control unit 220. In this instance, the slave control unit 220 may calculate the SOC of the battery module 10 based on the received voltage value.

The slave communication unit 230 may communicate with the master controller 100, and transmit and receive various pieces of data to/from the master controller 100. That is, the slave communication unit 230 may connect the slave controller 200 and the master controller 100 using various types of wired or wireless communication networks. Through this, the slave communication unit 230 may transmit the voltage value or the SOC of the battery module 10 received from the slave control unit 220 to the master controller 100, and transmit the CHARGE or DISCHARGE command received from the master controller 100 to the slave control unit 220.

The slave connector 240 may electrically connect the slave controller 200 and an electrical device or wire outside the slave controller 200. For example, the slave connector 240 may provide a terminal to directly connect the slave controller 200 to the equalization line 300. Accordingly, the slave connector 240 may allow electrical connection between the slave controller 200 and the master controller 100 through the equalization line 300.

Particularly, the slave connector 240 may have three or more connector terminals. Additionally, each connector terminal may be connected to the multiple unit lines provided in the equalization line 300.

For example, the slave connector 240 may have a positive electrode terminal 240_1, a first negative electrode terminal 240_2 and a second negative electrode terminal 240_3. Additionally, each connector terminal may be connected to different lines of the equalization line 300. That is, the positive electrode terminal 240_1 may be connected to the auxiliary line 350, and the first negative electrode terminal 240_2 and the second negative electrode terminal 240_3 may be connected to the odd line 310 or the even line 330.

Meanwhile, the connector terminal may be connected to the end of the slave charging/discharging channel L2. That is, when the slave connector 240 has three connector terminals, each connector terminal may be connected to a current channel provided in the slave charging/discharging channel L2.

For example, as shown in the configuration of FIG. 6, the slave charging/discharging channel L2 may be electrically connected to the slave connector 240. That is, the slave charging/discharging channel L2 may electrically connect two ends of the battery module 10 and the plurality of connector terminals provided in the slave connector 240.

Particularly, the slave charging/discharging channel L2 may include a current channel having one end connected to the positive electrode (+) of the battery module 10, and a current channel having one end connected to the negative electrode (−) of the battery module 10. Here, the current channel having one end connected to the positive electrode (+) of the battery module 10 may be connected to the positive electrode terminal 240_1. Additionally, the current channel having one end connected to the negative electrode (−) of battery module 10 may be connected to the first negative electrode terminal 240_2 and the second negative electrode terminal 240_3. In this configuration, the current for charging or discharging the battery module 10 may flow in the slave charging/discharging channel L2.

The slave switching unit 250 may be provided on the slave charging/discharging channel L2 to open/close the electricity channel. That is, the slave switching unit 250 may open/close the slave charging/discharging channel L2 according to the OPEN/CLOSE command received from the slave control unit 220. Particularly, the slave switching unit 250 may be provided on the current channel having one end connected the negative electrode (−) of the battery module 10, to open/close the current or adjust the direction of the charging/discharging current flowing in the slave charging/discharging channel L2 connecting the negative electrode (−) side of the battery module 10 and the first negative electrode terminal 240_2 and the second negative electrode terminal 240_3.

Here, the detailed description of the slave switching unit 250 is the same as described above in the description of the first master switching unit 151 shown in FIG. 4. That is, the slave switching unit 250 may be configured with a same or similar configuration to the first master switching unit 151. Additionally, the slave charging/discharging channel L2 may be the first direction line a, the second direction line b and the main line m shown in FIG. 4.

The fuse 260 may be provided on the slave charging/discharging channel L2 to shut off the line in the event that an overcurrent flows. That is, the fuse 260 may protect the battery module 10 and the slave switching unit 250 provided on the slave charging/discharging channel L2 from the overcurrent. Particularly, the fuse 260 may be provided between the negative electrode (−) of the battery module 10 and the slave switching unit 250.

Figure 7:
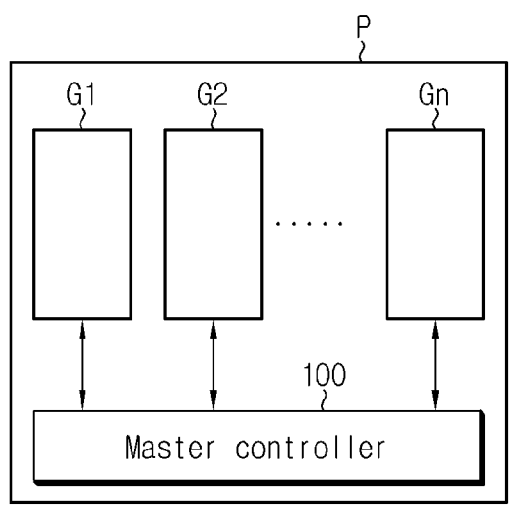
FIG. 7 is a schematic diagram showing the connection configuration between a plurality of battery groups and a master controller according to an embodiment of the present disclosure.

FIG. 7 is a schematic diagram showing the connection configuration between a plurality of battery groups and the master controller according to an embodiment of the present disclosure.

Referring to FIG. 7, the master controller 100 according to an embodiment of the present disclosure may be connected to each of a plurality of battery groups, i.e., a first battery group G1, a second battery group G2, and an $n^{th}$ battery group Gn. Here, the first battery group G1, the second battery group G2 and the $n^{th}$ battery group Gn may have the components that are the same as those of the battery group G shown in FIG. 1.

For example, in the embodiment of FIG. 7, the master controller 100 may be individually connected to each of the first battery group G1, the second battery group G2, and the $n^{th}$ battery group Gn. In this instance, the plurality of battery groups may include battery groups connected in series and/or in parallel. Accordingly, the battery pack P may have the increased output and/or capacity by the electrical connection between the battery groups.

In an embodiment of the present disclosure, the master controller 100 may receive the power from a battery group including the discharging target battery module 10 among the plurality of battery groups, and transmit the received power to a battery group including the charging target battery module 10. Here, the master controller 100 may set the discharging target battery module 10 and the charging target battery module 10 based on the voltage value or the SOC of each battery module 10.

Figure 8:
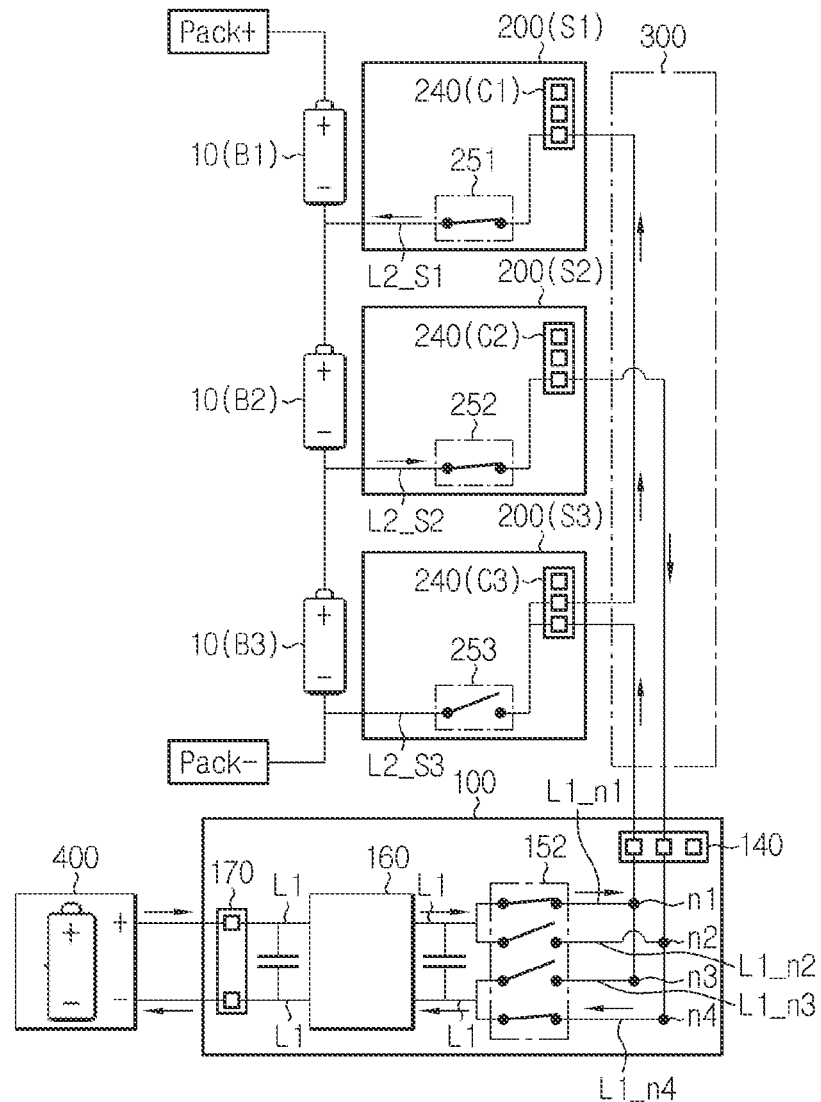
FIG. 8 is a schematic diagram showing the process of charging a certain battery module by a battery module equalization apparatus according to an embodiment of the present disclosure.

FIG. 8 is a schematic diagram showing the process of charging a certain battery module by the battery module equalization apparatus according to an embodiment of the present disclosure. For convenience of description, illustration and description of FIG. 8 will focus on the channel through which the charging current passes based on the configuration of the previously described embodiment.

Referring to FIG. 8, when the voltage value of the second battery module B2 is lower than other battery module 10, i.e., the first battery module B1 and the third battery module B3, the master controller 100 may set the second battery module B2 as a charging target battery module 10. In this instance, the second battery module B2 may be charged with the power supplied from the system power module 400.

In this case, the master controller 100 may select the first slave controller S1 and the second slave controller S2. That is, the master controller 100 may transmit an OPEN/CLOSE command to the first slave controller S1 and the second slave controller S2 to allow the charging current to flow in the two ends of the second battery module B2. In this instance, the first slave controller S1 and the second slave controller S2 may allow the electric current to flow in each slave charging/discharging channel L2 according to the OPEN/CLOSE command received from the master controller 100, and adjust the direction.

Specifically, the first slave controller S1 and the second slave controller S2 turn on the first slave switching unit 251 and the second slave switching unit 252, and may control the direction in which the current flows. Particularly, the first slave controller S1 and the second slave controller S2 may allow the charging current to flow to the positive electrode (+) of the second battery module B2 by allowing the charging current to flow in different directions in the negative electrode side channel (i.e., the channel between the negative electrode terminal of the corresponding battery module 10 and the negative electrode terminal of the slave connector 240) among each charging/discharging channel.

For example, as shown in the configuration of FIG. 8, the first slave controller S1 may adjust the current direction to allow the charging current to flow from the first slave connector C1 toward the negative electrode terminal of the first battery module B1 by controlling the switch provided in the first slave switching unit 251. Through this, the charging current flowing into the negative electrode side charging/discharging channel of the first slave controller S1 through the first slave connector C1 may flow to the positive electrode (+) of the second battery module B2 through the first slave switching unit 251 on the first slave charging/discharging channel L2_S1.

Additionally, the second slave controller S2 may adjust the current direction to allow the charging current to flow from the negative electrode terminal of the second battery module B2 toward the second slave connector C2 by controlling the switch provided in the second slave switching unit 252. Through this, the charging current flowing into the negative electrode side charging/discharging channel of the second slave controller S2 from the negative electrode (−) of the second battery module B2 may flow to the second slave connector C2 through the second slave switching unit 252 on the second slave charging/discharging channel L2_S2.

Meanwhile, the master controller 100 may transmit an OPEN/CLOSE command to the third slave controller S3 to disallow the charging current to flow on the third slave charging/discharging channel L2_S3. In this instance, the third slave controller S3 may allow the third slave switching unit 253 to be turned on based on the OPEN/CLOSE command received from the master controller 100.

For example, as shown in the configuration of FIG. 8, the third slave switching unit 253 of the third slave controller S3 may be kept in open state, and the current may not flow in the charging/discharging channel of the third slave controller S3. However, the third slave controller S3 may allow connection between the unit lines through the third slave connector C3. That is, the charging current flowing into the third slave controller S3 through the third slave connector C3 does not flow in the third slave charging/discharging channel L2_S3 and may flow out toward the equalization line 300 through the third slave connector C3.

Here, a detailed description of the process of adjusting the current conduction and the current direction at the first slave switching unit 251, the second slave switching unit 252, and the third slave switching unit 253 may be the same as described above in the description of the first master switching unit 151 of FIG. 4.

Alternatively, in the above-described configuration, disallowing the current to flow in the third slave charging/discharging channel L2_S3 may be implemented in such a way that the master controller 100 does not give any separate command. That is, all the slave switching units 250 are turned off in normal condition, and the master controller 100 may separately give a command to only the slave switching unit 250 to be turned on. For example, in the above-described configuration, the first to third slave switching units 251~253 are turned off in normal condition, and the master controller 100 may transmit an ON command of the slave switching unit 250 to only the first slave controller S1 and the second slave controller S2.

In this instance, the master controller 100 may select at least one slave controller 200 having the slave switching unit 250 to be turned on. That is, in the above-described configuration, the master controller 100 may select the first slave controller S1 and the second slave controller S2.

Additionally, the master controller 100 may selectively open/close the plurality of switches included in the second master switching unit 152. That is, the second master switching unit 152 may adjust the current direction for each of the plurality of lines passing through the second master switching unit 152.

For example, as shown in the configuration of FIG. 8, the second master switching unit 152 may adjust the current direction in which the charging current flows by controlling the plurality of switches provided in each of the four lines passing through the second master switching unit 152.

Particularly, the second master switching unit 152 may have four switches. In this instance, for convenience of description, each switch is referred to as first to fourth switches from top to bottom on the basis of the drawing. Here, the first switch may have one end (the right end in the drawing) connected to the first node n1, and the second switch may have one end connected to the second node n2. Additionally, the third switch may have one end connected to the third node n3, and the fourth switch may have one end connected to the fourth node n4. That is, the first switch and the third switch may be directly connected to the even channel L1_1, and the second switch and the fourth switch may be directly connected to the odd channel L1_2. Additionally, the other end (the left end in the drawing) of the first switch and the second switch may be directly connected to each other, and the other end of the third switch and the fourth switch may be directly connected to each other. Additionally, the connected end of the first switch and the second switch, and the connected end of the third switch and the fourth switch may be connected to different polarity channels of the master charging/discharging channel L1.

Specifically, the second master switching unit 152 may adjust the current direction of the two channels L1_n1, L1_n3 to allow the charging current to flow out of the master controller 100 through the connector terminal connected to the first node n1 and the third node n3 on the master charging/discharging channel L1 among the three connector terminals provided in the module connector 140.

That is, the second master switching unit 152 may allow the charging current to flow from the second master switching unit 152 to the first node n1 in the first channel L1_n1, and disallow the charging current to flow from the third node n3 to the second master switching unit 152 in the third channel L1_n3. To this end, in the above embodiment, the second master switching unit 152 may turn on the first switch among the two switches connected to the even channel L1_1, and turn off the third switch. Through this configuration, the second master switching unit 152 may transmit the charging current received from the converter 160 to the equalization line 300 through the module connector 140 via the first node n1.

Additionally, the second master switching unit 152 may adjust the current direction of the other two channels L1_n2, L1_n4 to allow the charging current to flow in from the outside of the master controller 100 through the connector terminal connected to the second node n2 and the fourth node n4 on the master charging/discharging channel L1 among the three connector terminals provided in the module connector 140.

That is, the second master switching unit 152 may allow the charging current to flow from the fourth node n4 to the second master switching unit 152 in the fourth channel L1_n4, and disallow the charging current to flow from the second node n2 to the second master switching unit 152 in the second channel L1_n2. To this end, in the above embodiment, the second master switching unit 152 may turn on the fourth switch among the two switches connected to the odd channel L1_2, and turn off the second switch. Through this configuration, the second master switching unit 152 may transmit, to the converter 160, the charging current received from the module connector 140 via the fourth node n4.

Through this, in the embodiment of FIG. 8, when the second battery module B2 is charged, the charging current flowing out of the positive electrode (+) of the system power module 400 may flow to the equalization line 300 the master charging/discharging channel L1 connecting the system connector 170, the converter 160, the second master switching unit 152 and the module connector 140. Additionally, the charging current may be transmitted to the first slave connector C1 of the first slave controller S1 through the equalization line 300, and may flow to the positive electrode (+) of the second battery module B2 through the first slave charging/discharging channel L2_S1. In this instance, the charging current may charge the second battery module B2. Additionally, the charging current flowing out of the negative electrode terminal of the second battery module B2 may be transmitted to the module connector 140 via the second slave charging/discharging channel L2_S2, the second slave connector C2 and the equalization line 300. Additionally, the current transmitted to the module connector 140 may flow to the system power module 400 through the master charging/discharging channel L1 passing through the fourth node n4, the second master switching unit 152, the converter 160 and the system connector 170.

Figure 9:
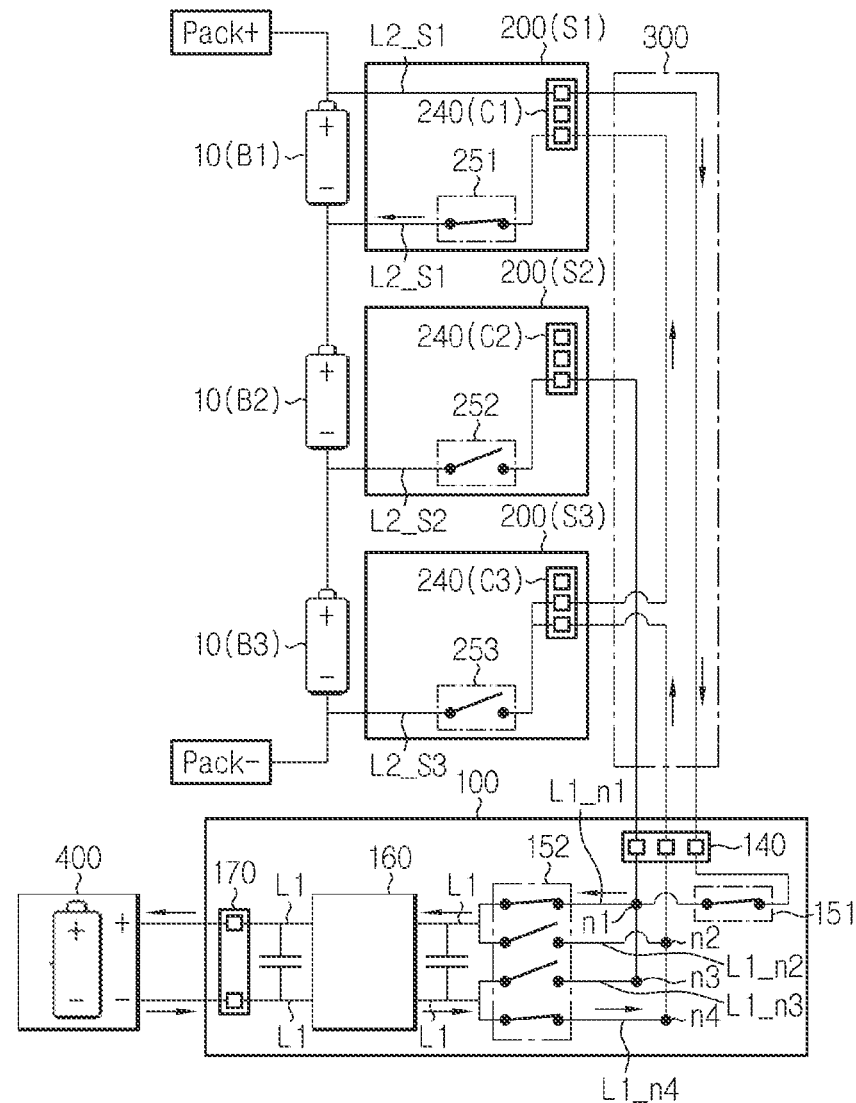
FIG. 9 is a schematic diagram showing the process of discharging a certain battery module by a battery module equalization apparatus according to an embodiment of the present disclosure.

FIG. 9 is a schematic diagram showing the process of discharging a certain battery module by the battery module equalization apparatus according to an embodiment of the present disclosure. For convenience of description, with regard to a certain description related to FIG. 9 to which the previously described embodiment may apply equally or similarly, its detailed description is omitted herein, and difference(s) will be described in detail. Meanwhile, FIG. 9 primarily shows the channel through which the discharging current goes, and does not show a portion of the charging/discharging channel through which the discharging current does not go.

Referring to FIG. 9, when the voltage value of the first battery module B1 is higher than other battery module 10, i.e., the second battery module B2 and the third battery module B3, the master controller 100 may set the first battery module B1 as a discharging target battery module 10.

In this instance, the first battery module B1 may be discharged and supply the power to the system power module 400.

In this case, the master controller 100 may select the first slave controller S1. That is, the master controller 100 may transmit an OPEN/CLOSE command to the first slave controller S1 to allow the discharging current to flow in the two ends of the first battery module B1. In this instance, the first slave controller S1 may allow the discharging current to flow according to the OPEN/CLOSE command received from the master controller 100 and adjust the direction.

Specifically, the first slave controller S1 may allow the discharging current to flow from the first slave switching unit 251 to the negative electrode (−) of the first battery module 10.

For example, as shown in the configuration of FIG. 9, the first slave controller S1 may allow the discharging current that discharges the first battery module B1 to flow by controlling the switch provided in the first slave switching unit 251. Through this, the discharging current discharging the first battery module B1 may be transmitted from the positive electrode terminal of the first battery module B1 to the positive electrode terminal of the first slave connector C1 through the first slave charging/discharging channel L2_S1. Additionally, the discharging current may be transmitted to the master controller 100 via the equalization line 300 (auxiliary line).

Additionally, the discharging current flowing into the first slave controller S1 through negative electrode terminal of the first slave connector C1 via the equalization line 300 from the master controller 100 may flow to the negative electrode (−) of the first battery module B1 through the first slave switching unit 251 on the first slave charging/discharging channel L2_S1.

Meanwhile, the master controller 100 may transmit an OPEN/CLOSE command to the second slave controller S2 and the third slave controller S3 to disallow the discharging current to flow on the second slave charging/discharging channel L2_S2 and the third slave charging/discharging channel L2_S3. In this instance, the second slave controller S2 and the third slave controller S3 may allow the second slave switching unit 252 and the third slave switching unit 253 to be turned off based on the OPEN/CLOSE command received from the master controller 100.

For example, as shown in the configuration of FIG. 9, the second slave switching unit 252 of the second slave controller S2 may be kept in open state, and the current may not flow in charging/discharging channel of the second slave controller S2. Through this, the discharging current flowing in the first slave charging/discharging channel L2_S1 may not flow to the positive electrode (+) of the second battery module B2.

Additionally, the third slave controller S3 may keep the third slave switching unit 253 in open state, and the current may not flow in the charging/discharging channel of the third slave controller S3. Through this, the discharging current flowing into the third slave controller S3 through the third slave connector C3 may not flow in the third slave charging/discharging channel L2_S3 and flow out toward the equalization line 300 through the third slave connector C3.

However, the third slave controller S3 may allow connection between the unit lines between the master controller 100 and the first slave controller S1 through the third slave connector C3.

Here, a detailed description of the process of adjusting the current conduction and the current direction at the first slave switching unit 251, the second slave switching unit 252, and the third slave switching unit 253 may be the same as described above in the description of the first master switching unit 151 of FIG. 4.

Alternatively, in the above-described configuration, disallowing the current to flow in the second slave charging/discharging channel L2_S2 and the third slave charging/discharging channel L2_S3 may be implemented in such a way that the master controller 100 does not give any separate command. That is, in the above embodiment, the first to third slave switching units 251~253 are turned off in normal condition, and the master controller 100 may transmit the TURN-ON command of the first slave switching unit 251 to only the first slave controller S1.

In this instance, the master controller 100 may select the slave controller 200 having the slave switching unit 250 to be turned on. That is, in the above-described configuration, the master controller 100 may select the first slave controller S1.

Additionally, the master controller 100 may selectively open/close at least one switch included in each of the first master switching unit 151 and the second master switching unit 152. That is, the first master switching unit 151 may adjust the conduction and the current direction of one line passing through the first master switching unit 151. Additionally, the second master switching unit 152 may adjust the conduction and the current direction for each of a plurality of lines passing through the second master switching unit 152.

For example, as shown in the configuration of FIG. 9, the first master switching unit 151 may adjust ON/OFF of the discharging current or the current direction by controlling the switch provided in one line passing through the first master switching unit 151. Additionally, the second master switching unit 152 may adjust the flow channel of the discharging current and the current direction by controlling the plurality of switches provided in each of the four lines passing through the second master switching unit 152. In this instance, with regard to the four switches provided in the second master switching unit 152, similar to the previous embodiment of FIG. 8, each switch connected to the first node n1, the second node n2, the third node n3 and the fourth node n4 is referred to as a first switch, a second switch, a third switch and a fourth switch.

Specifically, the second master switching unit 152 may adjust the current direction of the two channels L1_n2, L1_n4 to allow the discharging current to flow out of the master controller 100 through the connector terminal connected to the second node n2 and the fourth node n4 on the master charging/discharging channel L1 among the three connector terminals provided in the module connector 140.

That is, the second master switching unit 152 may allow the discharging current to flow from the second master switching unit 152 to the fourth node n4 in the fourth channel L1_n4, and disallow the discharging current to flow from the second node n2 to the second master switching unit 152 in the second channel L1_n2. To this end, the second master switching unit 152 may turn on the fourth switch among the two switches provided in the odd channel L1_2, and turn off the second switch. Through this configuration, the second master switching unit 152 may transmit the discharging current received from the converter 160 to the equalization line 300 through the module connector 140.

Additionally, the first master switching unit 151 and the second master switching unit 152 may adjust the current direction of the other two channels (L1_n1, L1_n3) to allow the charging/discharging current to flow in from the outside of the master controller 100 through the connector terminal connected to the first master switching unit 151 on the master charging/discharging channel L1 among the three connector terminals provided in the module connector 140.

That is, the first master switching unit 151 may allow the discharging current to flow from the module connector 140 to the first master switching unit 151. Additionally, the second master switching unit 152 may allow the discharging current to flow from the first node n1 to the second master switching unit 152 in the first channel L1_n1, and disallow the discharging current to flow from the third node n3 to the second master switching unit 152 in the third channel L1_n3. To this end, the second master switching unit 152 may turn on the first switch among the two switches provided in the even channel L1_1, and turn off the third switch. Through this configuration, the first master switching unit 151 and the second master switching unit 152 may transmit the discharging current received from the module connector 140 to the converter 160.

Through this, in the embodiment of FIG. 9, when the first battery module B1 is discharged, the discharging current flowing out of the positive electrode (+) of the first battery module B1 may be transmitted to the first slave connector C1 through the first slave charging/discharging channel L2_S1 of the first slave controller S1. Additionally, the discharging current may be transmitted to the module connector 140 of the master controller 100 through the equalization line 300 (auxiliary line), and may flow to the positive electrode (+) of the system power module 400 through the master charging/discharging channel L1 connecting the first master switching unit 151, the second master switching unit 152, the converter 160 and the system connector 170. In this instance, the discharging current may charge the system power module 400. Additionally, in this case, the current may be supplied from the negative electrode (−) of the system power module 400 to the equalization line 300 (odd channel) via the system connector 170, the converter 160, the second master switching unit 152 and the module connector 140.

Figure 10:
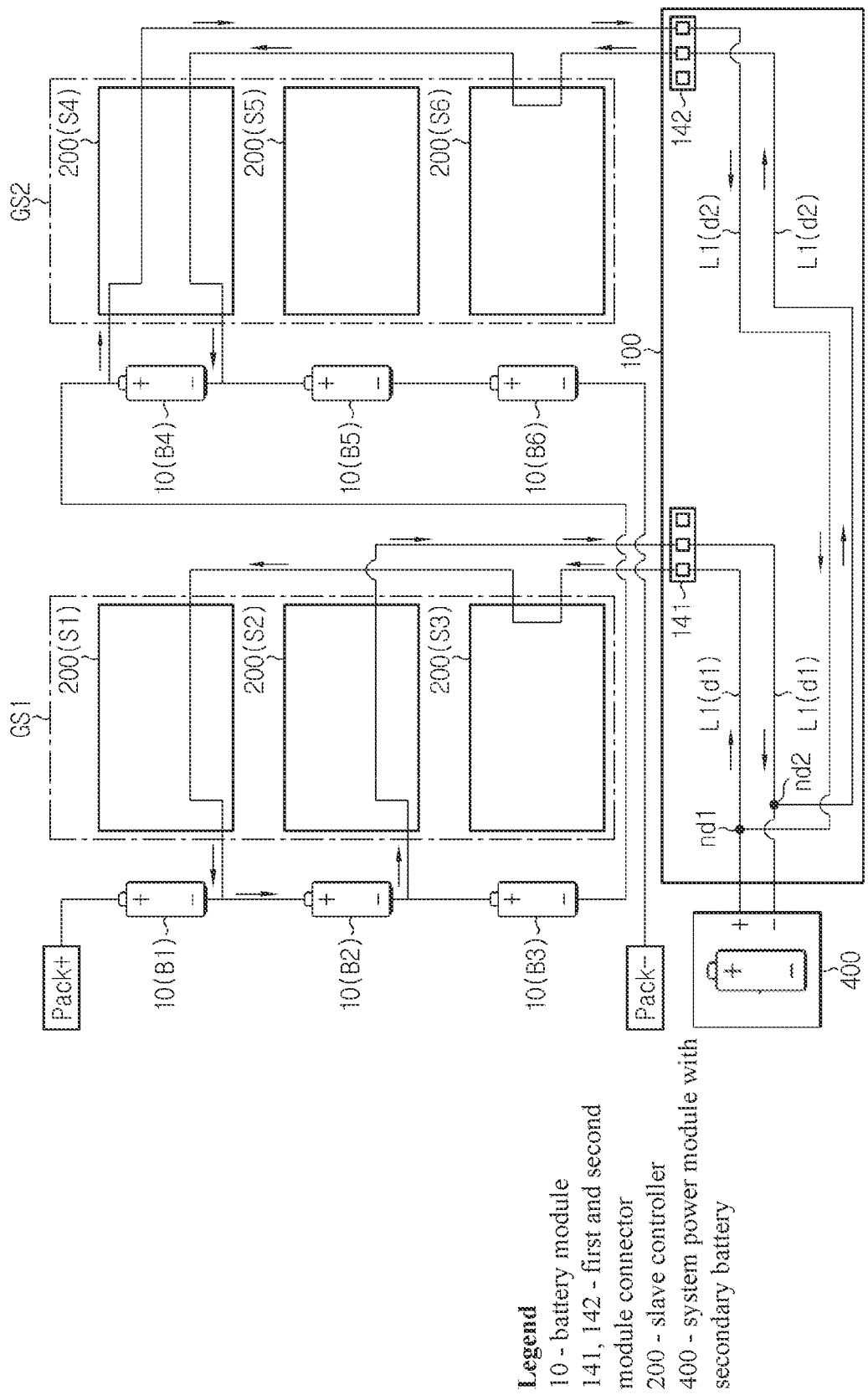
FIG. 10 is a schematic diagram showing the process of transmission and reception of charging/discharging power between different slave controllers by a battery module equalization apparatus according to an embodiment of the present disclosure.

FIG. 10 is a schematic diagram showing the process of transmission and reception of charging/discharging power between different slave controllers by the battery module equalization apparatus according to an embodiment of the present disclosure. For convenience of description, the same element as the previously described embodiment is omitted in FIG. 10, and the channel through which the charging/discharging current goes will be mainly provided.

Referring to FIG. 10, the master controller 100 according to an embodiment of the present disclosure may be directly electrically connected to a first group slave GS1 including the plurality of slave controllers 200 each connected to two or more battery modules 10 connected in series from the positive electrode (+) of the battery pack P. Additionally, the master controller 100 may be directly electrically connected to a second group slave GS2 including the plurality of slave controllers 200 each connected to two or more other battery modules 10 connected in series from the negative electrode (−) of the battery pack P.

For example, as shown in the configuration of FIG. 10, the first group slave GS1 may include the first slave controller S1, the second slave controller S2 and the third slave controller S3 respectively connected to the first battery module B1, the second battery module B2 and the third battery module B3. Additionally, the second group slave GS2 may include the fourth slave controller S4, the fifth slave connector C5 and the sixth slave controller S6 respectively connected to the fourth battery module B4, the fifth battery module B5 and the sixth battery module B6. That is, the master controller 100 may be connected to a plurality of group slaves. Here, each group slave may be connected in series.

Particularly, each of the first group slave GS1 and the second group slave GS2 may be separately connected to the master controller 100. To this end, the master controller 100 may include a first module connector 141 and a second module connector 142 each connected to the lines connecting the first group slave GS1 and the second group slave GS2 and the master controller 100. That is, the master controller 100 may include a plurality of module connectors 140.

The master charging/discharging channel L1 provided in the master controller 100 may include a plurality of unit channels, i.e., a first unit channel d1 and a second unit channel d2. Here, the first unit channel d1 may be a channel connected to the first module connector 141, through which the charging/discharging current flows. Additionally, the second unit channel d2 may be a channel connected to the second module connector 142, through which the charging/discharging current flows.

Particularly, the first unit channel d1 and the second unit channel d2 may be connected in parallel. That is, the first unit channel d1 and the second unit channel d2 may be connected to each unit node and may be connected in parallel. Here, the unit node may be a contact point on the master charging/discharging channel L1 at which the first unit channel d1 and the second unit channel d2 are connected to each other.

For example, as shown in the configuration of FIG. 10, the master charging/discharging channel L1 may have two unit nodes, i.e., a first unit node nd1 to which the line connected from the positive electrode (+) of the system power module 400 is connected, and a second unit node nd2 to which the line connected from the negative electrode (−) of the system power module 400 is connected.

Here, the first unit channel d1 and the second unit channel d2 may be connected in parallel through the first unit node nd1 and the second unit node nd2. That is, two lines each provided in the first unit channel d1 and the second unit channel d2 may be connected in parallel at the first unit node nd1 and the second unit node nd2.

Through this configuration, the master controller 100 may transmit charging/discharging power from the slave controller 200 belonging to one of the first group slave GS1 and the second group slave GS2 to the slave controller 200 belonging to a different group. That is, the master controller 100 may transmit the charging/discharging power between the first module connector 141 and the second module connector 142 through the first unit channel d1 and the second unit channel d2 connected in parallel. In this instance, the master controller 100 may transmit the charging/discharging power flowing out of a battery module 10 belonging to a group to another battery module 10 belonging to a different group.

For example, in the embodiment of FIG. 10, the discharging current flowing out of the fourth battery module B4 may flow to the second battery module B2 through the second module connector 142, the second unit channel d2, the first unit node nd1, the first unit channel d1, the first module connector 141 and the equalization line 300 provided in the master controller 100. Additionally, the current that charges the second battery module B2 and flows out of it may flow via the first module connector 141, the first unit channel d1, the second unit node nd2, the second unit channel d2 and the second module connector 142 through the equalization line 300. Here, a detailed description of the process of the flow of the charging/discharging current from each battery module 10 is the same as described above in FIGS. 8 and 9.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

Meanwhile, the term 'unit' such as 'switching unit', 'voltage measurement unit', 'communication unit' and 'control unit' is used herein, but this indicates a logical component unit and does not necessarily indicate a component that may be or should be physically separated between each component unit, and it is obvious to those skilled in the art that each component unit is not necessarily implemented by one element or device.

What is claimed is:

1. A battery module equalization apparatus for charge equalization between a plurality of battery modules connected in series, each battery module including at least one secondary battery, the battery module equalization apparatus comprising:
   a plurality of slave controllers electrically connected to the plurality of battery modules to measure voltage values of the plurality of battery modules, each slave controller having a slave charging/discharging channel through which the current that charges and discharges each battery module flows; and
   a master controller configured to:
   receive the voltage value of each battery module from the plurality of slave controllers,
   select at least one of the plurality of slave controllers based on the received voltage value, and
   transmit a CHARGE or DISCHARGE command to the at least one selected slave controller, and having a master charging/discharging channel through which the charging current supplied to the at least one slave controller and the discharging current supplied from the at least one slave controller flow,
   wherein the battery module equalization apparatus further comprises an equalization line through which the charging current and the discharging current flow the equalization line being configured to electrically connect the plurality of slave controllers and the master controller,
   wherein the equalization line includes a plurality of unit lines electrically connecting two different slave controllers among the plurality of slave controllers,
   wherein the plurality of slave controllers include an odd slave connected to an odd numbered battery module in an order of series connection among the plurality of battery modules, and an even slave connected to an even numbered battery module in an order of series connection among the plurality of battery modules, and
   wherein the plurality of unit lines include:
   an odd line connecting each connector provided in the odd slave, and
   an even line connecting each connector provided in the even slave.

2. A battery pack comprising:
   the battery module equalization apparatus according to claim 1.

3. A vehicle comprising:
   the battery module equalization apparatus according to claim 1.

4. The battery module equalization apparatus according to claim 1, wherein the plurality of unit lines further include an auxiliary line directly connected to a first slave connector provided in a first slave controller among the plurality of slave controllers and to a module connector provided in the master controller,
   wherein each of the odd line, even line and auxiliary line are separate from one another.

5. The battery module equalization apparatus according to claim 1, further comprising:
   a system power module including at least one system power module secondary battery, and electrically connected to the master controller to supply charging power to the master charging/discharging channel or receive discharging power from the master charging/discharging channel.

6. The battery module equalization apparatus according to claim 5, further comprising:
   a system converter disposed between the plurality of battery modules connected in series and the system power module to change the voltage.

7. The battery module equalization apparatus according to claim 1, wherein the plurality of slave controller includes a switching unit disposed on the slave charging/discharging channel, and having a plurality of switches to open/close the slave charging/discharging channel.

8. The battery module equalization apparatus according to claim 7, wherein the master controller selects at least one target battery module for equalization from the plurality of battery modules, and controls the switching unit by the slave controller directly connected to the selected battery module.

9. The battery module equalization apparatus according to claim 1, wherein the plurality of slave controllers include a first group slave connected to two or more battery modules connected in series on one side among the plurality of battery modules, and a second group slave connected to two or more other battery modules connected in series among the plurality of battery modules to a battery module connected to the first group slave, and
   the master controller includes a first module connector connected to the first group slave, and a second module connector connected to the second group slave.

10. The battery module equalization apparatus according to claim 9, wherein the master controller is configured to transmit the charging/discharging power from a slave controller belonging to one of the first group slave and the second group slave to a slave controller belonging to a different group.

11. The battery module equalization apparatus according to claim 9, wherein the master charging/discharging channel includes a first unit channel connected to the first module connector, and a second unit channel connected to the second module connector, and
   the first unit channel and the second unit channel are connected in parallel.

12. The battery module equalization apparatus according to claim 1, wherein the master controller includes a first master switching unit and a second master switching unit disposed on the master charging/discharging channel,
   wherein the master controller is spaced from the plurality of battery modules,
   wherein the second master switching unit has and having a plurality of switches to open/close the master charging/discharging channel, and
   wherein the master controller is configured to open/close at least one of the plurality of switches included in the second master switching unit based on the voltage value of each battery module.

13. The battery module equalization apparatus according to claim 12, wherein the first master switching unit includes a main line, a field effect transistor (FET), a diode and a switching controller.

14. The battery module equalization apparatus according to claim 13, wherein switching controller of the first master switching unit controls a first direction FET of the FET and a second direction FET of the FET.

15. A battery module equalization apparatus for charge equalization between first to third battery modules connected in series, each battery module including at least one secondary battery, the battery module equalization apparatus comprising:
a plurality of slave controllers including:
a first slave controller electrically connected to the first battery module to measure voltage values of the first battery module, and having a first slave switching unit provided on a first slave charging/discharging channel through which a current that charges and discharges the first battery module flows, a first end of the first slave switching unit being connected to a negative electrode of the first battery module and a positive electrode of the second battery module;
a second slave controller electrically connected to the second battery module to measure voltage values of the second battery module, and having a second slave switching unit provided on a second slave charging/discharging channel through which a current that charges and discharges the second battery module flows, a first end of the second slave switching unit being connected to a negative electrode of the second battery module and a positive electrode of the third battery module; and
a third slave controller electrically connected to the third battery module to measure voltage values of the third battery module, and having a third slave switching unit provided on a third slave charging/discharging channel through which a current that charges and discharges the third battery module flows, a first end of the third slave switching unit being connected to a negative electrode of the third battery module,
a master controller configured to receive the voltage value of the first to third battery modules from the first to third slave controllers, select at least one of the first to third slave controllers as a discharging target battery module based on the received voltage values, the master controller having a master charging/discharging channel through which a charging current is supplied to the at least one of the first to third slave controllers and a discharging current supplied from the at least one of the first to third slave controllers flow; and
an equalization line including:
an auxiliary line connected between a positive electrode of the first battery module and the master controller;
a first unit line connected between a second end of the first slave switching unit and a second end of the third slave switching unit;
a second unit line connected between a second end of the second slave switching unit and the master controller; and
a third unit line connected between the second end of the third slave switching unit and the master controller,
wherein the master controller is further configured to transmit a DISCHARGE command to the first slave controller when the first battery module is selected as the discharging target battery module; and the first slave controller is configured to turn on the first slave switching unit, to allow the discharging current to flow through the third unit line, the first unit line, the first slave switching unit, the first battery module, and the auxiliary line.

16. The battery module equalization apparatus according to claim 15, wherein the master controller includes a first master switching unit and a second master switching unit disposed on the master charging/discharging channel,
wherein the master controller is spaced from the first to third battery modules,
wherein the second master switching unit has a plurality of switches to open/close the master charging/discharging channel, and
wherein the master controller is configured to open/close at least one of the plurality of switches included in the second master switching unit based on the voltage value of each of the first to third battery modules.

17. A battery pack comprising:
the battery module equalization apparatus according to claim 15.

18. A vehicle comprising:
the battery module equalization apparatus according to claim 15.

19. The battery module equalization apparatus according to claim 15, further comprising:
a system power module including at least one system power module secondary battery, and electrically connected to the master controller to supply charging power to the master charging/discharging channel or to receive discharging power from the master charging/discharging channel.

20. The battery module equalization apparatus according to claim 19, further comprising:
a system converter disposed between the first to third battery modules connected in series and the system power module to change the voltage.

21. The battery module equalization apparatus according to claim 15, wherein the first to third battery modules are among a plurality of battery modules,
wherein the plurality of slave controllers include a first group slave connected to two or more battery modules connected in series on one side among the plurality of battery modules, and a second group slave connected to two or more other battery modules connected in series among the plurality of battery modules to a battery module connected to the first group slave, and
wherein the master controller further includes a first module connector connected to the first group slave, and a second module connector connected to the second group slave.

22. The battery module equalization apparatus according to claim 21, wherein the master controller is configured to transmit charging/discharging power from a first slave controller belonging to one of the first group slave and the second group slave to a second slave controller belonging to a different group than the first slave controller.

23. The battery module equalization apparatus according to claim 21, wherein the master charging/discharging channel includes a first unit channel connected to the first module connector, and a second unit channel connected to the second module connector, and
wherein the first unit channel and the second unit channel are connected in parallel.

* * * * *